(12) United States Patent  
Smith

(10) Patent No.: US 6,188,686 B1
(45) Date of Patent: *Feb. 13, 2001

(54) SWITCHING APPARATUS

(75) Inventor: Graeme Roy Smith, Manchester (GB)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/869,762

(22) Filed: Jun. 5, 1997

(30) Foreign Application Priority Data

Aug. 14, 1996 (GB) .................................................. 9617110

(51) Int. Cl.[7] .......................... H04L 12/28; H04L 12/50; H04L 12/56; H04Q 11/00
(52) U.S. Cl. .......................... 370/388; 370/398; 709/244
(58) Field of Search ..................................... 370/398, 218, 370/219, 412, 413, 369, 370, 366, 388, 395, 393; 709/243, 244; 395/200.48, 200.2

(56) References Cited

U.S. PATENT DOCUMENTS

| 5,003,508 | * | 3/1991 | Hall ....................................... 710/106 |
| 5,233,603 | * | 8/1993 | Takeuchi et al. ..................... 370/412 |
| 5,299,190 | | 3/1994 | LaMaire et al. ...................... 370/413 |
| 5,315,594 | * | 5/1994 | Noser ................................... 370/353 |
| 5,436,886 | * | 7/1995 | McGill .................................. 370/219 |
| 5,517,495 | | 5/1996 | Lund et al. ........................... 370/399 |
| 5,517,496 | | 5/1996 | Boyer et al. .......................... 370/415 |
| 5,546,391 | * | 8/1996 | Hochschild et al. ................. 370/413 |
| 5,579,480 | * | 11/1996 | Cidon et al. ......................... 709/243 |
| 5,737,334 | * | 4/1998 | Prince et al. ......................... 370/395 |
| 5,844,887 | * | 12/1998 | Oren et al. ........................... 370/218 |

FOREIGN PATENT DOCUMENTS 0 588 745  3/1994 (EP) .
0 739 151  10/1996 (EP) .
2 300 086  10/1996 (GB) .

OTHER PUBLICATIONS

Marrakchi et al., "Circuit and Systems Letters—A Neural Net Arbitrator for Large Crossbar Packet–Switches," *IEEE Transactions on Circuits and Systems*, vol. 36, No. 7, Jul. 1989, pp. 1039–1041.

Dhas et al., "Broadband Switching Architectures, Protocols, Designs & Analysis," *IEEE Computer Society Press Book*, 1991, Chapter 1.1, pp. 108–109.

Morris et al., "Neural Network Control of Communications Systems," *IEEE Transactions on Neural Networks*, vol. 5, No. 4, Jul. 1994, pp. 639–650.

(List continued on next page.)

Primary Examiner—Hassan Kizou
Assistant Examiner—John Pezzlo
(74) Attorney, Agent, or Firm—Staas & Halsey LLP

(57) ABSTRACT

Switching apparatus, for use in an ATM network for example, which includes a plurality of data units; cross-connect switching units, having a plurality of input ports and output ports, for providing data transfer paths, each path serving to pass data received at one of the input ports to one of the output port; and connection units connected to the input ports and to the data units, for delivering data from designated source data units to respective input ports and for delivering the data, after passage through one of the data transfer paths, from the output ports to respective designated destination data units. Two data units, which together constitute a data delivery group associated with an input port, are connected to each connection unit and the connection unit serves to deliver data from the two different data units of the data delivery group, at different respective times, to that associated input port. In such apparatus the number of input ports of the switching units is reduced. Other embodiments relate to a cross-connect switching device having bidirectional ports.

49 Claims, 11 Drawing Sheets

OTHER PUBLICATIONS

Park et al., "Applications of Neural Networks in High–Speed Communication Networks," *IEEE Communications Magazine*, Oct. 1995, pp. 68–74.

Reeve et al., "A Review of Non–Symbolic Artificial Intelligence Techniques for Network Management and Control," *IEEE 13th UK Teletraffic Symposium*, Strathclyde, Mar. 18–20, 1996, pp. 1/1–1/12.

* cited by examiner

SWITCHING APPARATUS

BACKGROUND OF THE INVENTION

1. Field of the Invention

The present invention relates to switching apparatus for use, for example, in asynchronous transfer mode (ATM) networks.

2. Description of the Prior Art

FIG. 1 of the accompanying drawings shows parts of switching apparatus previously considered for use in an ATM network. The switching apparatus 1 includes a plurality of data units $2_0$ to $2_3$, each data unit having an input portion $4_0$ to $4_3$ and an output portion $6_0$ to $6_3$. In FIG. 1, the output portion 6 of each data unit 2 is shown separately from the input portion 4 of the unit concerned, so as to clarify the operation of the apparatus, but it will be appreciated that both the input and output portions 4 and 6 form part of the same data unit 2.

Each data unit 2 is connected to one or more data input/output ports $DP_0$ to $DP_7$ of the switching apparatus; for example, as shown in FIG. 1, each data unit is connected to a pair of data ports DP.

The apparatus 1 further comprises a cross-connect switching unit 8 having as many input ports $IP_0$ to $IP_3$ and as many output ports $OP_0$ to $OP_3$ as there are data units 2. Each input portion 4 is connected to one of the input ports IP and each of the output portions 6 is connected to one of the output ports OP.

The cross-connect switching unit 8 is controllable selectively to provide connections between its input ports and its output ports. Up to four simultaneous connections, each between one of its input ports and one of its output ports, can be provided. For example, if data is received by the apparatus 1 at data port $DP_2$ (the "source" data port) that is to be routed to data port $DP_4$ (the "destination" data port), the cross-connect switching unit 8 is configured to provide a connection between the input portion $4_1$ of the data unit $2_1$ (the "source data unit" having the source data port $DP_2$ connected to it) to the output portion $6_2$ of the data unit $2_2$ (the "destination data unit") which has the destination data port $DP_4$ connected to it. Thus, the source data unit $2_1$ and the destination data unit $2_2$ form a data-unit pair and are allocated a data transfer path within the apparatus for use in passing data from the source data unit of the pair to the destination data unit of the pair. At the same time, up to three other such data-unit pairs can be allocated respective data transfer paths by the switching unit 8 to enable data received at source data ports connected with the respective source data units of those pairs also to be routed through the switch to the respective destination data units of the pairs, those destination data units being connected with the relevant destination data ports.

Since it is possible for two (or more) source data ports to wish to communicate at the same time to the same destination data port, it is normal to make provision for some buffering of the data at some point within the switching apparatus, either within the data units 2 or in the cross-connect switching unit 8, or possibly in both. This buffering holds up the data of one of the two contending source data ports pending transfer to the intended destination data port of the data received at the other of those two contending source data ports.

In practice, switching apparatus for use in an ATM network may require a large number of data ports and hence a large number of data units 2. For example, it may be desired to provide ATM switching apparatus with several hundred data ports. This inevitably requires a large number of data units 2 and a correspondingly-large number of input ports and output ports on the cross-connect switching unit 8.

However, the number of input ports and output ports which a switching unit can have is limited when (as is generally desired) the switching unit is formed as an integrated circuit. For example, it is not readily practicable to provide an integrated circuit package with more than 300 connection pins at the sorts of data transfer rate required in ATM switching applications.

It is accordingly desirable to provide switching apparatus in which the above-mentioned restriction on the number of input and output ports of the cross-connect switching unit no longer limits the size of the switching apparatus.

BRIEF SUMMARY OF THE INVENTION

According to a first aspect of the present invention there is provided switching apparatus including: a plurality of data units; cross-connect switching means, having at least one input port and at least one output port, for providing a data transfer path serving to pass data received at the said input port to the said output port; and connection means connected to the said input port and to at least two of the said data units, which data units together constitute a data delivery group associated with that input port, and operable to deliver data from the different data units of the data delivery group, at different respective times, to that associated input port.

In such apparatus the number of input ports of the cross-connect switching means can be reduced because the data units of the data delivery group share access to the same input port on a time-division basis.

Usually, the said cross-connect switching means have a plurality of such input ports, for example 32 or 64 input ports. The connection means are preferably connected to all of the data units of the said plurality and to all of the said input ports and are operable to deliver data from each data unit of the said plurality to at least one input port of the cross-connect switching means.

There is preferably such a data delivery group, made up of at least two of the said data units, associated with every input port of the cross-connect switching means. In this way significant reductions (a halving at least) in the number of input ports required by the cross-connect switching means can be achieved.

The data units of a data delivery group could be connected by a common data bus to the associated input port, with each unit able to send data to the input port when the other units of the group are in an output-disabled condition. Alternatively, in one preferred embodiment the said connection means are operable to provide each data unit of each data delivery group with its own controllable input connection from the data unit to its said associated input port, each said input connection being switchable from a data-passing state, in which it serves to pass data from its data unit to said associated input port, to a data-blocking state in which it is in a high-impedance condition; the switching of the input connections being controlled so that when the input connection of any one of the data units of the group is in the data-passing state the input connection of each other data unit of that group is in the data-blocking state. This avoids the need for the data units themselves to have special output-disabling circuitry.

When the number of output ports required by the cross-connect switching means exceeds the number that can be physically provided on a single cross-connect switching unit (e.g. an integrated circuit) the said cross-connect switching means may include a plurality of individual switching units, each switching unit providing the cross-connect switching means with fewer output ports than there are data units in the apparatus, and being operable to provide such data transfer paths only between the input ports of the unit and the output ports of the switching unit. In this case, it is advantageous that, for each said data delivery group, the said connection means are operable at one time to deliver data from one data unit of the group to the input port associated with that group, which is an input port of one of the switching units, and are operable at another time to deliver data from that data unit to a further one of the said input ports which is an input port of another of the switching units. In this way, the data unit can send data to other data units via the output ports of both switching units so that connection flexibility is enhanced. If, for example, each output port is connected exclusively to one data unit, the number of destination data units to which a source data unit can send its data are not restricted to just the number of output ports of a single switching unit. Also, throughput of data is maintained because, when one data unit of a data delivery group has data to send to the cross-connect switching means, even if the input port of one switching unit is being used by another member of the same group, the one data unit can send its data to the input port of another switching unit.

For full flexibility and throughput, for each data unit, the said connection means are preferably operable to deliver data at different respective times from the data unit to an input port of each different switching unit of the said plurality.

In this way, each data delivery group can have such an associated input port on each different one of the switching units. When, for example, the apparatus has M such switching units, where M≧2, each providing up to N input ports, there are preferably N data delivery groups, each having M data units.

In one preferred implementation, the connection means include, for each data unit, a corresponding connection unit including an input circuit having a data input connected to the data unit for receiving data therefrom, and also having as many data outputs as there are switching units in the said plurality, each data output being connected an input port of a different one of said switching units, the input circuit being controllable to deliver at a selected one of those data outputs the data received at its said data input and to place the or each remaining data output in a high-impedance state. Such connection units require only simple circuit elements and are accordingly convenient low-cost items.

Alternatively, the said connection means may comprise time-division multiplexing means for each data delivery group, operable repetitively to perform a preselected sequence of switching cycles that includes at least one first switching cycle, in which the time-division multiplexing means serve to deliver to the input port associated with the group data received from a first data unit of that group, and also includes at least one second switching cycle in which the time-division multiplexing means serve to deliver to that associated input port data received from a second data unit of that group different from the said first data unit of the group. The switching cycles are preferably of the same duration (the duration required to transfer a packet of data through the switching fabric). This arrangement is simple to control since the same sequence of switching cycles is repeated. The sequence will normally include one type of switching cycle for each data unit of the group, e.g. first, second, third and fourth switching cycles for a four-data-unit group. There can simply be one switching cycle per data unit in the sequence, e.g. one first switching cycle followed by one second switching cycle, providing alternate first and second switching cycles. Alternatively, there could be more first switching cycles than second switching cycles in the sequence if the first data unit operates at a faster rate than the second data unit of the group, e.g. a sequence of five switching cycles made up of four first switching cycles and a single second switching cycle could be used.

When only alternate first and second cycles are required, the time-division multiplexing means can be simple circuits operating autonomously. Preferably, however, to provide a flexible design which can be used in many different situations, the connection means further comprise scheduling means, connected with the time-division multiplexing means for each data delivery group, for setting the said sequence of switching cycles in dependence upon externally-applied control information. This control information could be provided by an overall switching controller, used to control all components of the apparatus, or by the data units of the data delivery group, and could be changed during operation of the apparatus to cope with changes in the traffic conditions. The control information would only need to be supplied on set up, or from time to time in accordance with changes in traffic conditions, so that the control burden on the external controller would not be significant.

In one preferred implementation the connection means include a connection unit corresponding to each data delivery group; the connection unit comprising an input circuit having a plurality of data inputs connected respectively to the data units of the data delivery group, and also having a single data output connected to the input port associated with the group, and being operable, in each switching cycle of the said preselected sequence that is allocated to each data unit of the group, to deliver, at its said data output, data received by the input circuit, via one of its said data inputs, from the data unit.

Such a connection unit requires only simple circuit elements and so can be cheap to produce.

Preferably, the connection unit corresponding to each data delivery group further comprises an output circuit having a single data input connected to one of the said output ports, and also having a plurality of data outputs connected respectively to the data units of the data delivery group, and controllable to deliver the data received during each switching cycle to a selected one of its data outputs.

It is convenient from the circuit layout point of view to provide the output circuit in the same package as the input circuit as the input and output circuits both connect the same set of data units to the cross-connect switching unit.

There are also other reasons why the connection means are preferably connected also to the said output ports of the cross-connect switching means to serve to deliver the data output by one data unit, after passage through the data transfer path, from the output port of that path to another of the said data units.

For example, when connected to the output ports as well, the connection means may be adapted to receive the data from the data units in n-bit parallel form and include first data conversion means for converting the received data into bit-serial form or into m-bit parallel form, where m<n, for delivery to the said input ports, and also adapted to receive the data in said bit-serial form or in said m-bit parallel form, as the case may be, from the said output ports and include second data conversion means for converting the received bit-serial-form or m-bit-parallel-form data into said n-bit parallel form for delivery to the data units. This conversion of the data into m-bit or bit-serial form enables the number of connection pins per data transfer path (both on the connection means and the cross-connect switching means) to be reduced significantly.

Preferably, the said cross-connect switching means are selectively controllable to provide a plurality of such data transfer paths at the same time, each path having an input port and an output port and serving to pass data received at its said input port to its said output port; the data units are operable in pairs to exchange packets of data, one of the two data units of each such data-unit pair being a source data unit and the other of the two data units being a destination data unit that is to receive such a data packet from the source data unit of the pair, and each data-unit pair being allocated a different one of the said data transfer paths for use in transferring a data packet from its said source data unit to its said destination data unit; and the said connection means serve to deliver such data packets in parallel from the respective source data units of the data-unit pairs to the respective input ports of the data transfer paths allocated respectively to the pairs. Such parallel processing of the data packets for different pairs can provide a high throughput of data, for example 128×155 Mbits/s or 256×155 Mbits/s paths may be provided.

Switching control means are advantageously connected to the said data units for designating the data-unit pairs. In this way, overall (global) control of the switching resources is possible in a sophisticated manner. For example, the switching control means may be operable to designate the data-unit pairs in such a way as to avoid data packet contention in the apparatus. Such contention could otherwise occur at one of the input ports or one of the output ports of the cross-connect switching means. This makes it possible for the cross-connect switching means to be essentially memory-less, for example the cross-connect switching means could have a memory capacity of two data packets or less per data transfer path.

Alternatively, or in addition, the switching control means may be operable to determine the data-unit pair designations in dependence upon the volume and/or type of data received by the data units of the said plurality, in other words in dependence upon actual traffic conditions. If, for example, each data unit queues the data destined for other data units of the apparatus, the switching controller can monitor the queue fill levels for the different destination data units to determine whether congestion is occurring for traffic from any particular source data unit to any particular destination data unit (i.e. any particular data-unit pair) and, if so, change the pair allocations to allow more opportunities for the pair to transfer data. Neural networks or other learning systems can be used to implement the switching controller so that the controller can be proactive rather than simply reactive.

The data units may operate asynchronously, with each data-unit pair making use of a data transfer path for an indefinite period, but preferably the said cross-connect switching means and the said connection means and the said data units are operable synchronously to perform a series of switching cycles, the switching control means being operable to determine the data-unit pair designations for each switching cycle, and in each switching cycle respective data packets belonging to the data-unit pairs are transferred in parallel through the respective allocated data transfer paths provided by the cross-connect switching means.

Such a synchronous switch is convenient to control and contention problems can be avoided as the switching fabric configuration is only changed at the end of each switching cycle. Each switching cycle is preferably of the same duration (the duration required to transfer a data packet through the switching fabric, but the cycles can alternatively be of variable duration depending on the traffic conditions.

The data units may also be operable to exchange data in multicast groups, each group being made up of one such source data unit and more than one such destination data unit, and each multicast group being allocated as many such data transfer paths as there are destination data units in the group concerned for use in transferring such a data packet output by the said source data unit in parallel to all of the said destination data units of the group. Such a method of multicasting is very fast as the multicast packet is sent simultaneously to all the destination data units. Also, the operations required by the source data units to deal with multicast data are simple, as the multicast packet only needs to be output once to the switching fabric, the multicasting effectively being implemented by the switching fabric.

When the apparatus performs switching cycles, one of the said switching cycles may be designated as a multicast switching cycle in which such a data packet output by the source data unit of such a multicast group is transferred in parallel to all of the destination data units of the group. This simplifies control of the apparatus as multicast cycles are handled analogously to normal (unicast) cycles.

The multicast packet could be sent by the connection means to plural input ports of the cross-connect switching means. Preferably, however, the data packet output by the said source data unit of such a multicast group is delivered by the connection means to a single one of the ports of the cross-connect switching means, and the data transfer paths allocated to the group all have that port as their respective said input ports but have different respective said output ports. This simplifies control of the connection means and leaves more input ports free.

The said source data unit of each designated data-unit pair, or each multicast group, as the case may be, is preferably operable to include in each said data packet routing information indicating the said destination data unit of the packet. In this case, the said cross-connect switching means may include self-routing means operable, when such a data packet is received by the cross-connect switching means at one of its said ports, to allocate the packet such a data transfer path having that port as its said input port and having as its said output port a further one of the ports selected by the self-routing means in dependence upon the said routing information included in the packet. Alternatively, or in addition, the connection means include self-routing means operable, when such a data packet is received by the connection means, to determine the port of the cross-connect switching means to which that packet is to be delivered in dependence upon the said routing information included in the packet. Using such self-routing components in the switching fabric reduces the control burden on the switching controller.

The said cross-connect switching means may have a plurality of dedicated input ports, each for receiving data only, and a plurality of dedicated output ports, each for outputting data only. Alternatively, the cross-connect switching means may have bidirectional ports which can be selected as the said input port or as the said output port of such a data transfer path. This can further reduce the number of ports required by the cross-connect switching means.

When switching cycles are performed, in this case the said switching cycles should have respective input and output phases, and each of the said bidirectional ports can be selected as the said input port of one of the said data transfer paths in the said input phase of the cycle, and as the said output port of another of the said data transfer paths in the said output phase of the cycle.

Preferably, at least part of the circuitry of the connection means has redundancy circuitry. This is readily possible at low cost because the connection means employ only simple circuit elements. Such redundancy is highly desirable, for example, in wide-area network (WAN) applications.

In one preferred implementation, each said data unit is connected operatively to one or more data ports of the apparatus and serves to pass data received at its data ports to the connection means and to pass to its data ports data that has been switched by the cross-connect switching means.

Apparatus as described above is particularly advantageously applied in ATM switching applications, in which applications the data packets each comprise one or more ATM cells.

According to a second aspect of the present invention there are provided connection means as set out above. For example, one embodiment can provide a connection device, for use in ATM switching apparatus to deliver data from a data unit to a plurality of input ports of a switch, including an input circuit having: a data input for connection to the said data unit to receive data therefrom; a plurality of data outputs for connection respectively to the said input ports, each data output being switchable from an active state, in which it serves to output data, to an inactive state in which it has a high impedance; and data transfer means connected between the said data input and the said data outputs and operable to pass data received at the said data input to a selected one of the said data outputs, that selected data output being switched to the said active state, and to switch the or each remaining data output to the said inactive state.

Preferably, the said data input of the input circuit is adapted to receive data in n-bit parallel form from the said data unit, and each data output is adapted to output data in bit-serial form or m-bit parallel form, where m<n, the data transfer means including first data conversion means for converting the n-bit parallel-form data received at the said data input into said bit-serial-form or said m-bit parallel form data for output at the said selected one of the data outputs.

Preferably, the connection device further includes an output circuit having a data input for connection to an output port of the switch and adapted to receive data therefrom in said bit-serial form or said m-bit parallel form as the case may be, and also having a data output for connection to the said data unit and adapted to output data thereto in said n-bit parallel form, the output circuit including second data conversion means connected between the said data input and the said data output of the output circuit for converting said bit-serial-form or said m-bit-parallel-form data received at the data input of the output circuit into said n-bit parallel-form data for output at the said data output of the output circuit.

Such a connection device may also be adapted for connection to such a data unit which delivers its said data to the data input of the input circuit in the form of data packets, each packet including routing information indicating an intended destination of the packet, the device further comprising self-routing means operable, when a packet is received at the said data input of the input circuit, to select the data output of the input circuit from which the packet is to be output in dependence upon the said routing information.

Another such connection device, for use in ATM switching apparatus to deliver data from a plurality of different data units to an input port of a switch, includes an input circuit having: data inputs for connection respectively to the said data units to receive data therefrom; a data output for connection to the said input port; and data transfer means connected between the said data inputs and the said data output and operable to select the data inputs individually in a predetermined sequence and to pass data received at the selected data input to the said data output.

This connection device preferably further includes an output circuit having a single data input for connection to an output port of the switch to receive data therefrom, and also having a plurality of data outputs for connection respectively to the said data units, and data transfer means connected between the said data input and the said data outputs of the output circuit and operable to pass data received at that data input to a selected one of those data outputs.

Preferably, each said data input of the input circuit is adapted to receive data in n-bit parallel form from one of the data units, and the data output of the input circuit is adapted to output data in bit-serial form or m-bit-parallel-form, where m<n, the data transfer means of the input circuit including first data conversion means for converting the n-bit parallel-form data received at each said data input into said bit-serial-form or m-bit-parallel-form data for output at the selected data output of the input circuit; and the said data input of the output circuit is adapted to receive data from the said output port in said bit-serial form or said m-bit-parallel-form as the case may be, and each said data output of the output circuit is adapted to output data to one of the data units in said n-bit parallel form, the data transfer means of the output circuit including second data conversion means for converting the bit-serial-form or m-bit-parallel-form data received at the data input of the output circuit into parallel-form data for output at the said selected data output of the output circuit.

Such a connection device may be adapted for connection to data units which deliver their said data to the respective data inputs of the input circuit in the form of data packets, each packet including routing information including an intended destination of the packet, the device further comprising self-routing means operable, when such packet is received at the said data input of the said output circuit, to select the data output of the output circuit from which that packet is to be output in dependence upon the said routing information.

According to a third aspect of the present invention there is provided a cross-connect switching device including: a plurality of ports, at least one of which is a bidirectional port; data transfer means selectively controllable to provide a plurality of data transfer paths, each for transferring data from one of the ports to another of the ports; and port control means connected between the data transfer means and the said bidirectional port and switchable from an input configuration, in which that port is employed as an input port for receiving data to be transferred to another port by the data transfer means, to an output configuration in which the same port is employed as an output port for outputting data received at another port and transferred to the said output port by the data transfer means.

In such a device the number of ports can be reduced because the same port is employed both as an input port and as an output port, on a time-division basis analogous to the employment of the same input port on a time-division basis to receive data from two different data units in the aforesaid first and second aspects of the present invention.

Preferably, each of the said ports is a bidirectional port; and the said port control means are connected with each of the ports of the said plurality and are operable, when in the said input configuration, to employ each of the ports as an input port for receiving data to be transferred to another port by the data transfer means, and, when in the said output configuration, to employ each of the said ports as an output port for outputting data received at another port and transferred to the output port concerned by the data transfer means. This can enable the number of ports to be halved as compared with a conventional device having dedicate input ports and output ports.

For example, to simplify control and reduce internal buffering requirements, the device is preferably operative alternately in input and output phases, the said port control means having the said input configuration in each said input phase and having the said output configuration in each said output phase.

Such a device may be adapted to receive data at its said ports in the form of data packets, each packet including routing information, the device further comprising: self-routing means operable, when such a data packet is received at one of the said ports, to employ such routing information to determine the port to which that packet is to be transferred by the data transfer means. The routing information carried by each data packet may indicate the intended destination of the packet concerned, but alternatively each data packet received by the device at one of its said ports may carry routing information indicating the intended destination of the next data packet that is to be received by the device at the port concerned, and the said self-routing means employ the routing information received with each packet to determine the port to which the next packet is to be transferred by the data transfer means. This "feed-forward" self-routing method enables the device to establish the data transfer path for the next data packet as soon as the data transfer of the current packet is complete, so that it is not necessary to provide buffering for two successive packets at each port; buffering for one packet is then sufficient, reducing the cost of the device as well as transmission delays in the device.

Preferably, the device further includes: multicast means connected with the said data transfer means and operable to cause the data transfer means to provide two or more such data transfer paths for transferring data received at one of the said ports in parallel to respective other ports of the device. In such a device, multicasting is fast and, being implemented exclusively by the device, enables the design of other components such as data units used with the device to be simplified.

According to a fourth aspect of the present invention there is provided switching apparatus including a plurality of data units and cross-connect switching means selectively controllable to provide a plurality of such data transfer paths at the same time, each path having an input port and an output port and serving to pass data received at its said input port to its said output port; wherein the data units are operable in pairs to exchange packets of data, one of the two data units of each such data-unit pair being a source data unit and the other of the two data units being a destination data unit that is to receive such a data packet from the source data unit of the pair, and each data-unit pair being allocated a different one of the said data transfer paths for use in transferring a data packet from its said source data unit to its said destination data unit, there being means for delivering the data packet from the source data unit of each pair to the said input port of the allocated data transfer path and for delivering the data packet, after passage through that path, from the said output port of the path to the destination data unit of the pair; and the said cross-connect switching means and the said data units are operable synchronously to perform a series of switching cycles such that in each such switching cycle such data packets are transferred in parallel from the respective source data units of the data-unit pairs to the respective destination data units of the pairs via the data transfer paths allocated respectively to the pairs.

Such a synchronous switch is convenient to control and contention problems can be avoided as the switching fabric configuration is only changed at the end of each switching cycle. Each switching cycle is preferably of the same duration (the duration required to transfer a data packet through the switching fabric, but the cycles can alternatively be of variable duration depending on the traffic conditions.

The apparatus does not need to use connection means as used in switching apparatus embodying the first aspect of the invention.

The apparatus preferably further includes switching control means connected to the said data units and operable to determine the data-unit pair designations for each switching cycle. In this way, overall (global) control of the switching resources is possible in a sophisticated manner.

For example, the switching control means may be operable to designate the data-unit pairs in each switching cycle in such a way as to avoid data packet contention in the apparatus. Such contention could otherwise occur at one of the input ports or one of the output ports of the cross-connect switching means. This makes it possible for the cross-connect switching means to be essentially memory-less, for example the cross-connect switching means could have a memory capacity of two data packets or less per data transfer path.

Alternatively, or in addition, the switching control means may be operable to determine the respective data-unit pair designations for the switching cycles in dependence upon the volume and/or type of data received by the data units of the said plurality, in other words in dependence upon actual traffic conditions. If, for example, each data unit queues the data destined for other data units of the apparatus, the switching controller can monitor the queue fill levels for the different destination data units to determine whether congestion is occurring for traffic from any particular source data unit to any particular destination data unit (i.e. any particular data-unit pair) and, if so, change the pair allocations to allow more opportunities for the pair concerned to transfer data. Neural networks or other learning systems can be used to implement the switching controller so that the controller can be proactive rather than simply reactive.

According to a fifth aspect of the present invention there is provided switching apparatus including: a source data unit operable to output data packets; and switching means, having an input port connected operatively to the said source data unit and also having two or more output ports, and operable to provide each such data packet received at the said input port with a data transfer path serving to pass the packet to one of the said output ports; wherein the said source said data unit is operable to send respective first and second such data packets in succession to the said input port, the said first data packet including routing information indicating an intended destination in the apparatus of the said second data packet; and the said switching means include self-routing means operable to extract such routing information from the said first data packet, when received at the said input port, and to employ that information to determine the said output port of the data transfer path for the said second data packet.

The switching means are preferably cross-connect switching means which have the advantage of being essentially memory-less, but could alternatively be memory-based switching types such as matrix, delta and Clos types.

According to respective sixth and seventh aspects of the present invention there are provided the source data unit and the switching means respectively of switching apparatus embodying the aforesaid fifth aspect of the invention.

According to an eighth aspect of the present invention there is provided a method of routing data packets in switching apparatus including: a source data unit operable to output data packets; and self-routing switching means having an input port connected operatively to the said source data unit and also having two or more output ports, and operable to provide each such data packet received at the said input port with a data transfer path serving to pass the packet to one of the said output ports; in which method: the said source said data unit sends respective first and second such data packets in succession to the said input port, the said first data packet including routing information indicating an intended destination in the apparatus of the said second data packet; and the said self-routing switching means extract such routing information from the said first data packet, when received at the said input port, and employ that information to determine the said output port of the data transfer path for the said second data packet.

In the aforesaid fifth to eighth aspects of the invention, the "feed-forward" self-routing method enables the switching means to establish the data transfer path for the next data packet as soon as the data transfer of the current packet is complete, so that it is not necessary to provide buffering for two successive packets at each port; buffering for one packet is then sufficient, reducing the cost of the switching means as well as transmission delays in the switching means.

BRIEF DESCRIPTION OF THE PREFERRED EMBODIMENTS

Figure 1:
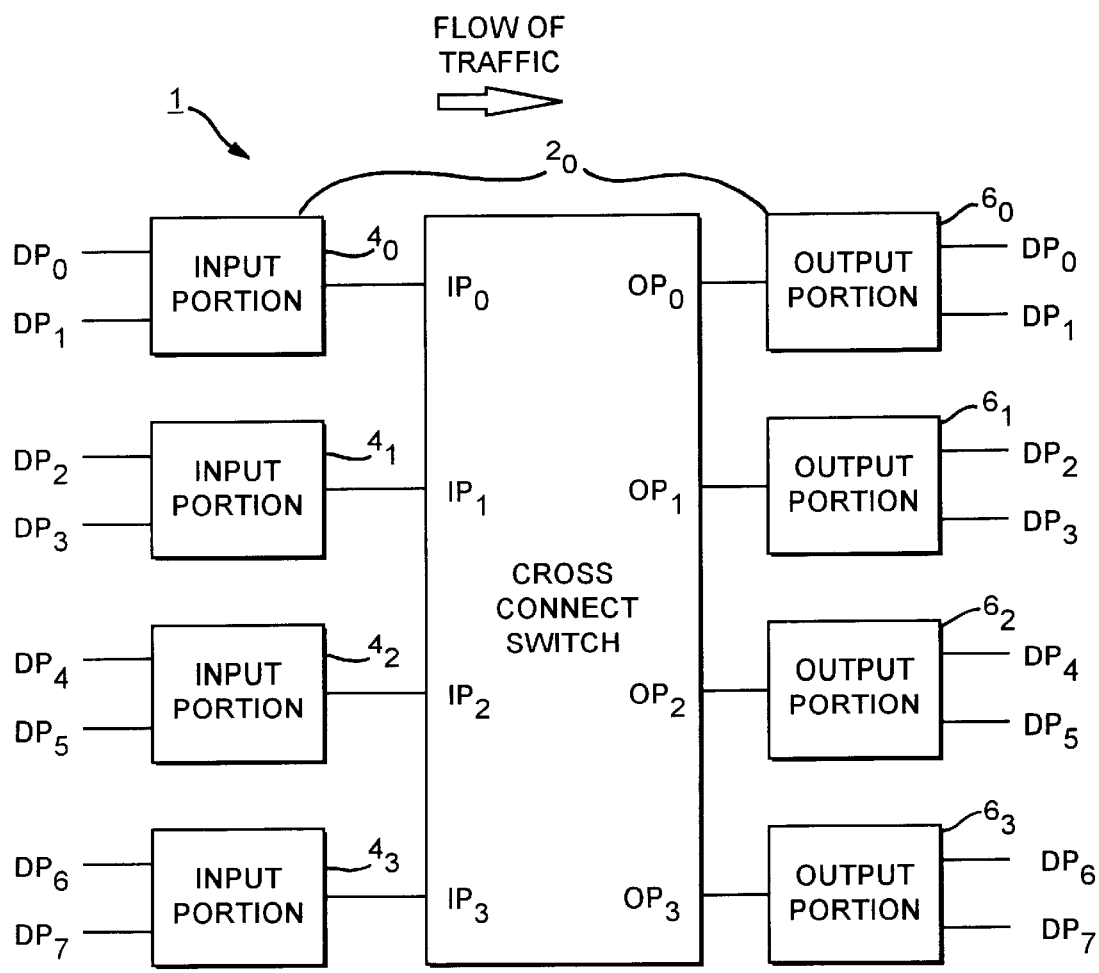
FIG. 1, discussed hereinbefore, shows a block diagram of switching apparatus previously-considered for use in an ATM network.
Figure 2:
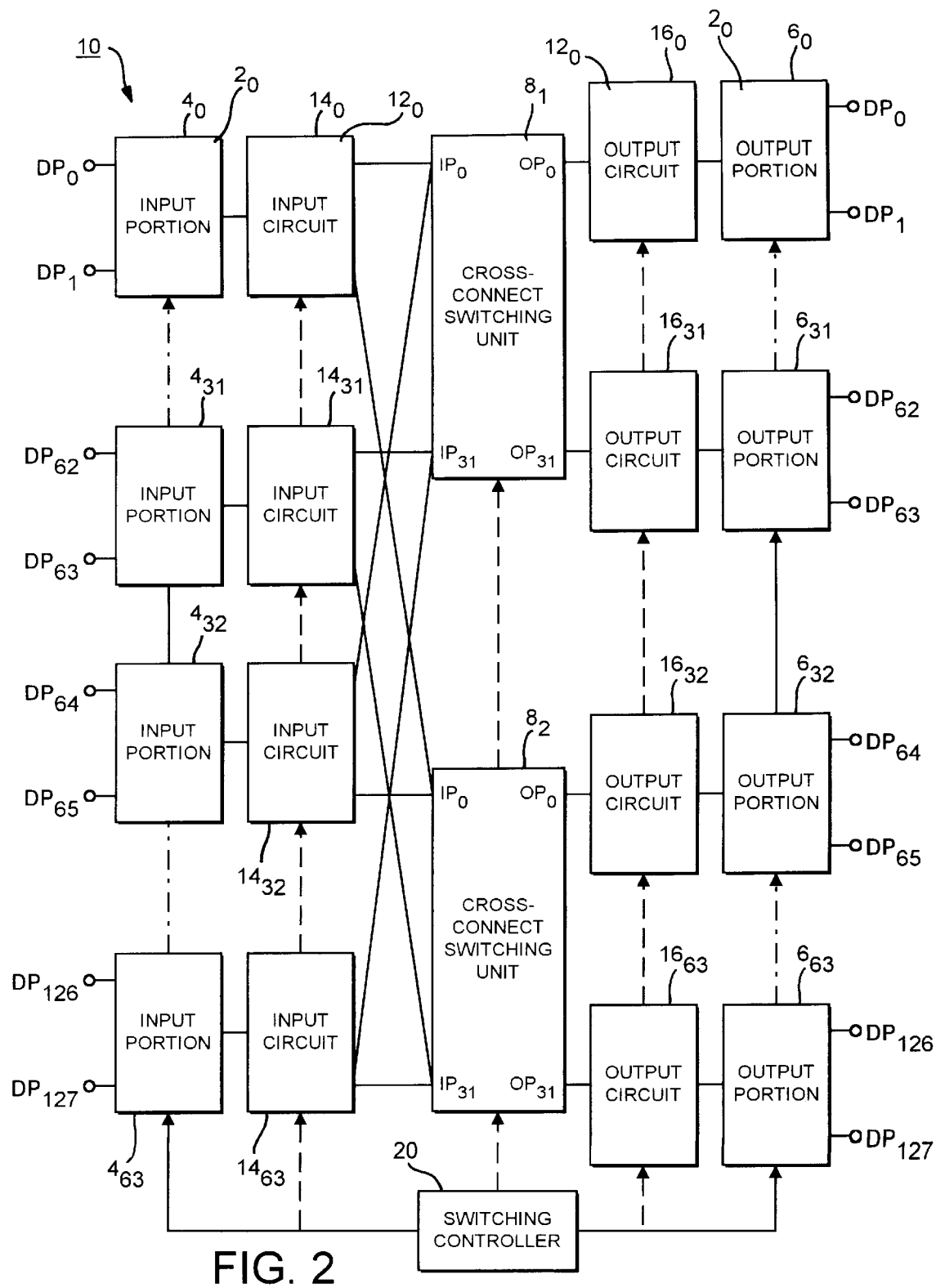
FIG. 2 shows a block diagram of parts of ATM switching apparatus embodying the aforesaid first aspect of the present invention.

FIG. 2 shows a block diagram of parts of ATM switching apparatus according to a first embodiment of the present invention. In FIG. 2, parts which correspond to, or are the same as, parts of the FIG. 1 apparatus are denoted by the same reference numerals. The apparatus 10 includes 64 data units $2_0$ to $2_{63}$, each having an input portion 4 and an output portion 6. For the sake of clarity, in FIG. 2 only the input and output portions of the data units $2_0$, $2_{31}$, $2_{32}$ and $2_{63}$ are shown.

Two data ports DP are connected with each of the data units $2_0$ to $2_{63}$. It will be appreciated that each data unit 2 could have just one data port connected to it, or could have more than two data ports connected to it. Furthermore, it is not necessary for each data unit 2 to have the same number of data ports connected to it. Each data port is preferably a user-network-interface (UNI) port.

The input portion 4 of each data unit 2 includes memory for buffering data received at the data ports DP associated with the data unit concerned; similarly, the output portion 6 of each data unit 2 also includes memory for data buffering purposes.

The apparatus 10 of FIG. 2 further comprises first and second cross-connect switching units $8_1$ and $8_2$. Each switching unit 8 has 32 input ports $IP_0$ to $IP_{31}$ and 32 output ports $OP_0$ to $OP_{31}$. Each switching unit 8 is operable to provide up to 32 simultaneous connections (data transfer paths) between its input ports and its output ports.

In addition, the FIG. 2 switching apparatus further comprises 64 connection units $12_0$ to $12_{63}$ corresponding respectively to the data units $2_0$ to $2_{63}$. Each connection unit has an input circuit 14 and an output circuit 16. Again, only the input and output circuits of the connection units $12_0$, $12_{31}$, $12_{32}$ and $12_{63}$ are shown in FIG. 2, in the interests of clarity.

The input circuit 14 of each connection unit 12 has an input connected to the input portion 4 of the data unit 2 corresponding to the connection unit. The input circuit 14 of each connection unit 12 also has two outputs, the first output being connected to an input port IP of the first switching unit $8_1$ and the second output being connected to an input port IP of the second switching unit $8_2$. As described later in more detail, the input of each input circuit is a parallel input designed to receive data in parallel form from its connected data-unit input portion 4, but the two outputs of each input circuit 14 are tri-state serial outputs designed to output data in bit-serial (or bit-serial differential) form. The input circuit 14 converts the received parallel data into bit-serial form and this serial data is output selectively on one of the two outputs of the input circuit 14. This parallel-to-serial conversion is carried out in the input circuits 14 in order to deliver the data to the switching units in serial form and hence reduce the number of connection pins required on the switching units 8.

The output circuit 16 of each connection unit 12 is connected between an output port OP of one of the switching units 8 and the output portion 6 of the data unit 2 corresponding to the connection unit 12. Each output circuit has a serial input and a parallel output, and carries out a serial-to-parallel conversion on bit-serial data received at its input and outputs the resulting parallel data at its output.

As shown in FIG. 2, each switching-unit input port is connected to two different input circuits. For example, the input port $IP_0$ of the first switching unit $8_1$ is connected to the first output of the input circuit $14_0$ and to the first output of the input circuit $14_{32}$. The data units $2_0$ and $2_{32}$, to which these two input circuits $14_0$ and $14_{32}$ correspond respectively, accordingly form a data delivery group associated with the input port $IP_0$ of the switching unit $8_1$. There is one such data delivery group for each first-switching-unit input port.

Furthermore, each data delivery group is also associated with an input port of the second switching unit $8_2$. For example, the data delivery group made up of the data units $2_0$ and $2_{32}$ is associated with the input port $IP_0$ of the second switching unit $8_2$ as well with the input port $IP_0$ of the first switching unit $8_1$. Thus, the input portion $4_{32}$ can transfer data received at its associated data ports $DP_{64}$ and $DP_{65}$ either to the first switching unit $8_1$ or to the second switching unit $8_2$ depending on the required destination data port of the data. If the destination data port is one of the data ports $DP_0$ to $DP_{63}$, then the data is transferred via the first output of the input circuit $14_{32}$ to the input port $IP_0$ of the first switching unit $8_1$, whereas if the destination data port is one of the data ports $DP_{64}$ to $DP_{127}$, then the data is transferred via the second output of the input circuit $14_{32}$ to the input port $IP_0$ of the second switching unit $8_2$. Because the outputs of each input circuit 14 are of the tri-state type, two outputs can be connected to the same switching-unit input port, only one of the outputs being enabled (active) at any given time.

In the FIG. 2 apparatus, each switching unit only has enough output ports to deliver data to a subset of the data units. For example, the 32 output ports of the first switching unit $8_1$ are connected, via the output circuits $16_0$ to $16_{31}$, only to the data units $2_0$ to $2_{31}$ respectively. However, by selecting the members of the data delivery groups appropriately, it is ensured that each data unit can receive data from any other data unit, even though the destination data unit is only connected to one of the switching units.

The switching apparatus shown in FIG. 2 further comprises a switching controller 20 which is connected to all of the data units $2_0$ to $2_{63}$ and all the connection units $12_0$ to $12_{63}$ and also to the two cross-connect switching units $8_1$ and $8_2$. As described later in more detail, the switching controller 20 controls the data units 2, the connection units 12 and the switching units 8 to establish the required connections between the data ports dynamically when the apparatus is in use.

Operation of the FIG. 2 switching apparatus will now be described in detail.

The FIG. 2 apparatus is designed to operate synchronously in a series of switching cycles. Each switching cycle should be sufficiently long to transfer at least one cell of ATM data. The switching cycles do not all need to be of the same duration, however. For example, depending upon the traffic conditions, long switching cycles, sufficient to transmit tens of ATM cells, could be used at certain times, whereas at other times short switching cycles, sufficient only to transmit a single ATM cell through the apparatus, could be used.

In use of the apparatus 10, ATM cells are received at the data ports $DP_0$ to $DP_{127}$ from ATM channels (virtual channels) connected with those data ports. These ATM channels may be constant bit rate (CBR), variable bit rate (VBR), available bit rate (ABR) or unspecified bit rate (UBR) channels. The VBR channels can be real-time variable bit rate (RT-VBR) channels and/or non-real-time variable bit rate (NRT-VBR) channels. Even for the CBR and VER channels the arrival times of ATM cells belonging to the channel connected at the switching apparatus 2 are unpredictable, being subject to the vagaries (especially variable delays) of the ATM network providing the channel concerned.

Each received ATM cell carries in its header portion routing information (cell address, made up of a virtual path identifier (VPI) and virtual channel identifier (VCI)) for use by the switching apparatus to determine to which destination data port the cell should be routed.

Figure 3:
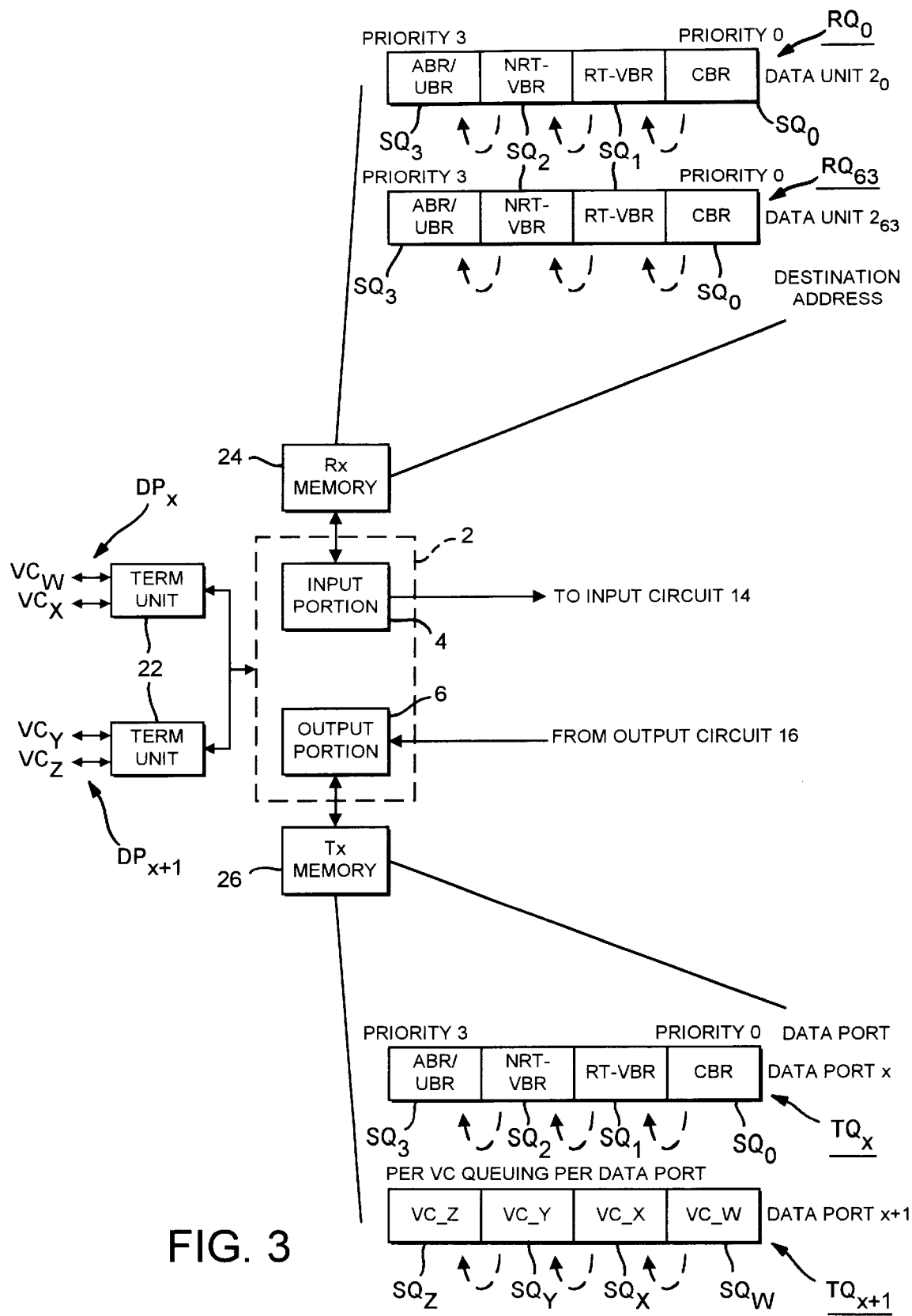
FIG. 3 is a schematic diagram for explaining queuing of data in the FIG. 2 apparatus.

FIG. 3 shows in more detail one of the data units 2 and its two associated data ports $DP_x$ and $DP_{x+1}$. Each data port $DP_x$ and $DP_{x+1}$ is connected via a termination unit 22 to the data unit 2. Cells arriving at each of the data ports $DP_x$ and $DP_{x+1}$ are deframed, synchronised and error-checked by the termination units 22. The termination units 22 transfer valid cells to the data unit 2. In the data unit 2 the cells are optionally "policed" by the input portion 4 to determine whether they are in accordance with previously-agreed traffic parameters for the ATM channel to which the cell concerned belongs.

The input portion 4 has a look-up table which registers, for each of the different receive channels connected to the data ports $DP_x$ and $DP_{x+1}$, a corresponding destination data unit to which cells of that receive channel should be transferred. In particular, the routing information (cell address) carried by each received cell is employed to define the address in the look-up table at which the identity of the destination data unit corresponding to that cell address is registered.

Using the look-up table, cells are then stored in a receive memory 24 in different queues according to the different destination data units to which they are to be transferred. Thus, as shown in FIG. 3, the receive memory 24 provides 64 main receive queues $RQ_0$ to $RQ_{63}$ corresponding respectively to the different possible destination data units $2_0$ to $2_{63}$. In addition, it is preferable, as shown in FIG. 3, to divide up each of the main queues $RQ_0$ to $RQ_{63}$ into a plurality of sub-queues $SQ_0$ to $SQ_3$, corresponding respectively to the different levels of priority of the cells. For example, cells belonging to constant-bit-rate channels have the highest priority (priority 0) and are accordingly stored in the highest-priority sub-queue $SQ_0$ of the relevant main queue. Cells belonging to real-time variable bit rate channels have the next-highest priority (priority 1) and these are stored in the next-highest priority sub-queue $SQ_1$ of the relevant main queue. Cells belonging to non-real-time variable bit rate and available bit rate/unspecified bit rate channels are stored in further, lower-priority sub-queues $SQ_2$ and $SQ_3$ of the relevant main queue. The number of different priority levels is not restricted to just four as shown in FIG. 3. For example, up to 64 different priority levels can be accommodated by sub-dividing each main receive queue RQ into 64 different sub-queues $SQ_0$ to $SQ_{63}$. It is also not essential to separate the cells into sub-queues according to priority; a single main receive queue RQ for each destination data unit may be sufficient in certain circumstances.

Incidentally, the look-up table may be internal to the input portion 4 or may itself also form part of the receive memory 24.

The input portion 4 of each data unit 2 has a local scheduler which registers control information, supplied to the data unit concerned by the switching controller, for use in determining which receive queue (and sub-queue, if used) is permitted to transfer data to the switching fabric in each switching cycle.

The combination of queues permitted to transfer data in each switching cycle is determined by the switching controller 20 in such a way as to avoid contention of cells within the switching apparatus. Such contention could occur at an input port of the switching units 8 (because two input circuits 14 are connected to the same input port IP) or at an output port of one of the switching units (because two data-unit input portions 4 both wish to send data to the same data-unit output portion 6).

Because the switching controller 20 is able to determine the connections through the switch to avoid such contention problems, the "switching fabric" (provided by the connection units 12 and the switching units 8) can be a simple cross-connect arrangement which does not require any buffering (apart, possibly, from cell pipeline buffers as explained hereinafter). This means that the switching fabric itself can be inexpensive.

The switching controller 20 has access to information relating to the receive queues $RQ_0$ to $RQ_{63}$ in the receive memory 24 of each data unit and uses this information, in particular the queue fill levels and priorities, to identify any queues (or sub-queues, if provided) that are experiencing congestion in the switching apparatus, and, where appropriate, to change the control information registered in the input-portion local schedulers so as to alleviate such congestion.

As well as designating the destination data unit for each source data unit in each switching cycle in this way, in the present embodiment the switching controller 20 also supplies control information to the connection units 12 and switching units 8 to set their configurations appropriately to provide the required connection from each source data unit to its destination data unit. This connection exists for the duration of the switching cycle concerned. Once the connections for use in a switching cycle have been established, the input portion 4 of each source data unit reads a cell or cells (depending on the length of the switching cycle) from the queue for its designated destination data unit and transfers the cell(s) to the parallel input of the input circuit 14 of its connection unit 12. The entire cell (header and payload) is transferred. The rate of transfer is, for example, 622 Mbits/s (38.9 million 16-bit words per second). The header is transferred with the payload because the routing information carried by the header is needed by the destination data unit to determine the destination data port.

In the input circuit 14 the parallel cell data is converted into bit-serial data at 622 Mbits/s. This bit-serial data is delivered to one of the two serial outputs of the input circuit 14 in accordance with the control information provided by the switching controller 20. As mentioned previously, the switching controller 20 ensures that only one of the two input-circuit outputs connected to each switching-unit input port is active in any switching cycle so as to avoid input-port contention at the switching units.

The serial data arriving at the input ports of the switching units 8 is transferred to the appropriate output ports of the switching units, again in accordance with the control information provided by the switching controller 20. The bit-serial data is converted back into 16-bit parallel form by the output circuits 16 of the connection units 12 and is received by the output portions 6 of the destination data units 2.

Referring again to FIG. 3, at the destination data unit 2 the received cell data is stored in a transmit memory 26 of the output portion 6. The cells are again stored in different queues, but in this case the queues correspond respectively to the two data ports $DP_x$ and $DP_{x+1}$ connected with the data unit. Thus, as shown in FIG. 3, the transmit memory 26 has a first transmit queue $TQ_x$ corresponding to the data port $DP_x$ and a second transmit queue $TQ_{x+1}$ corresponding to the data port $DP_{x+1}$. The identity of the destination data port $DP_x$ or $DP_{x+1}$ for each cell is established by the output portion 6 by using the routing information (cell address) carried by the cell to define the address in another look-up table similar to the look-up tables in the input portions 4.

The transmit queues can again be sub-divided into sub-queues SQ in a number of different ways. For example, FIG. 3 shows the main transmit queue $TQ_x$ for the data port $DP_x$ divided into sub-queues $SQ_0$ to $SQ_3$ according to cell priority as was the case for the receive queues $RQ_0$ to $RQ_{63}$. As an alternative, FIG. 3 also shows the main transmit queue $TQ_{x+1}$ for the data port $DP_{x+1}$ divided into sub-queues $SQ_W$ to $SQ_Z$ corresponding respectively to the different virtual channels $VC_W$ to $VC_Z$ connected to that destination data port $DP_{x+1}$.

It will be appreciated that any suitable combinations of sub-queue types can be used in the transmit memory 26. It would also be possible simply to store the cells received from the switching units 8 in the transmit memory 26 exclusively on a cell priority basis (i.e. not on a per data port basis).

Accordingly, it can be seen that in the FIG. 2 switching apparatus switching is effectively performed in two stages. In the first stage, cells received at the data ports are stored by the data-unit input portions 4 in their respective receive memories 24. Still at the first stage, these cells are transferred by the switching fabric to the relevant destination data-unit output portions 6 where they are stored in the respective transmit memories 26. The second-stage switching occurs when the cells are transferred from the transmit memories 26 to one of the data ports via one of the termination units 22 connected to the data unit 2 concerned.

In order to reduce congestion in the switching apparatus and allow more cells to reach their destination data units, it is advantageous for each data unit 2, each connection unit 12, and each switching unit 8 to be capable of operating, at certain times, at a faster rate than the sum of the respective line rates (UNI line rates) of the data ports connected with the data units. For example, the data units 2, connection units 12 and switching units 8 could be capable of operating at double the sum of the UNI line rates. In this case the switching controller 20 can issue an instruction to increase the frequency at which the data units 2, connection units 12 and switching units 8 are clocked so that, for short periods of time, these components of the switching fabric would operate at the above-mentioned faster rate. In this way, more opportunities can be provided to switch cells from source data units to destination data units. This is desirable since avoidance of contention in the switching fabric may mean that cells cannot be transferred from certain source data units in certain switching cycles. Operating the switching fabric components faster can therefore give a chance to "catch up".

In a similar manner, it may also be desirable to reduce the frequency at which the above-mentioned components of the switching fabric are clocked to slow down the switching process to a rate below the sum of the UNI line rates so that the switching controller 20 can update the control information in the local schedulers of the data-unit input portions 4.

It will be seen that in the FIG. 2 apparatus all of the cell queues are implemented in the data units 2. Thus, all the memory associated with the switching process is implemented in the same place, at each data unit, and is not distributed throughout the switching apparatus as in previous proposals.

The use of the switching controller to determine the source-destination paths in each switching cycle is advantageous in that it can assist in ensuring a fair allocation of switch resources and available bandwidth amongst the contending traffic sources. The switching controller can be relatively sophisticated in the way in which it determines the source-destination paths. For example, the switching controller could include a neural network or other adaptive learning means which could learn from previous experience how to predict and deal with future traffic flow situations. This would enable the switching controller to be proactive, predicting future traffic conditions and determining the best source-destination paths to deal with them, rather than simply reactive.

The number of serial outputs of each input circuit 14 in FIG. 2 is not limited to two. For example, if there are four switching units 8, the input circuits 14 would each have four serial outputs connected respectively to the different switching units. In this case, the data delivery groups would each have four data units, and each group would have four associated input ports on different respective switching units. There need to be as many different data delivery groups as there are input ports on each switching unit. The output circuits 16 are unchanged from those shown in FIG. 2. This can enable more switching units to be included in the switching fabric and hence enable a larger number of data units to be supported.

It is not essential for the input circuits to have serial outputs: the outputs could deliver parallel data to the switching units depending on the type of switching units used. The output data width could be the same as the input data width (e.g. 16 bits wide in the above embodiment) but preferably the input circuits output parallel data of lower width (e.g. four or eight bits wide) to the switching units so as to enable the number of connection pins needed on the switching units per input port (and also, correspondingly, per output port) to be reduced. Generally, switching units using GaAs technology can operate sufficiently fast (e.g. 1.2 Gbits/s) to handle serial traffic, but slower CMOS-technology switching units may require four-bit parallel data to cope with the same data transfer rates.

Components of the FIG. 2 switching apparatus will now be described in more detail with reference to FIGS. 4 to 7.

Figure 4:
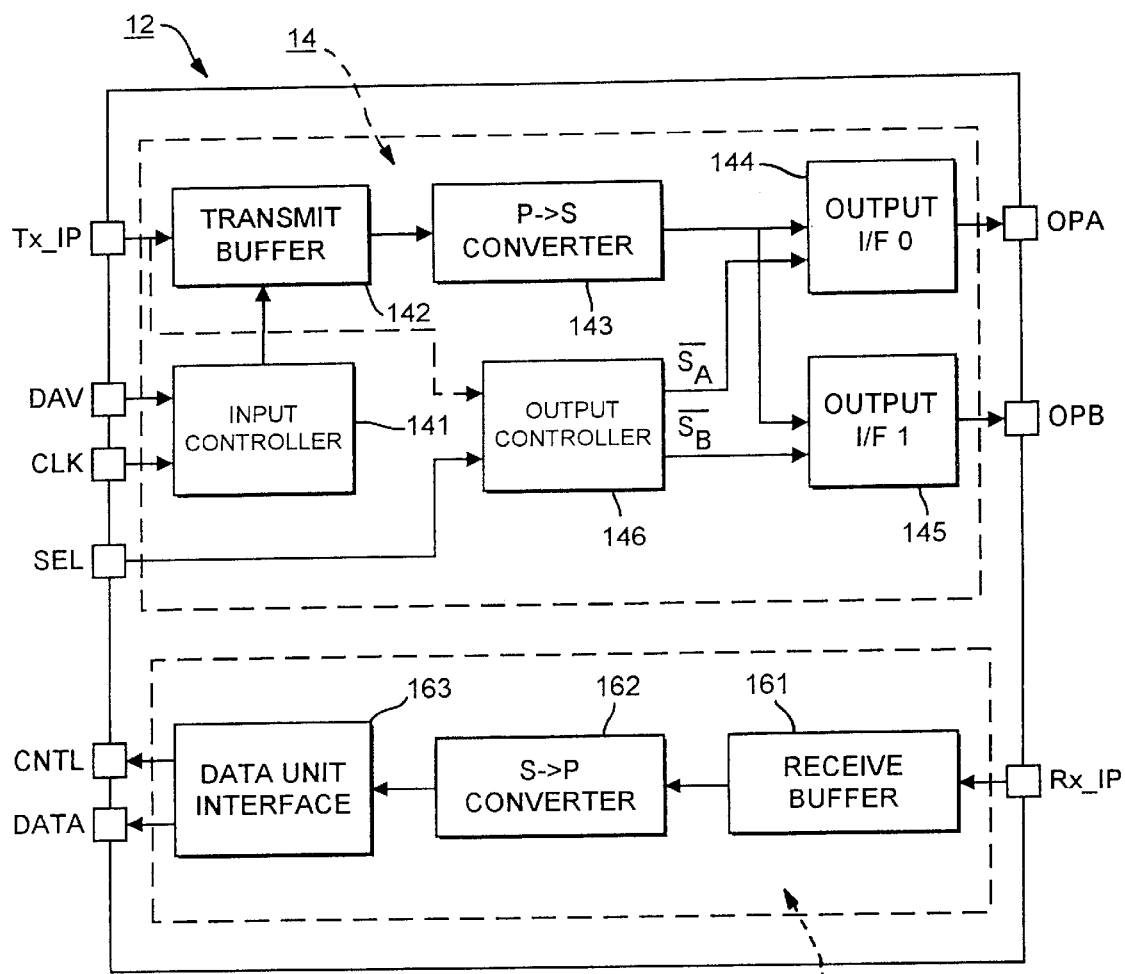
FIG. 4 shows a block circuit diagram of one component of the FIG. 2 apparatus, which component embodies the aforesaid second aspect of the present invention.

FIG. 4 shows the detailed construction of one of the connection units 12 of the FIG. 2 apparatus. The input circuit 14 includes an input controller 141, a transmit buffer 142, a parallel-to serial converter 143, respective first and second output drivers 144 and 145, and an output controller 146. The input circuit 14 receives 16-bit parallel data at its transmit input $T_xIP$ when a data valid (DAV) input of the input controller 141 is active. The 16-bit parallel data is buffered by the transmit buffer 142 and passed to the parallel-to-serial converter 143 which converts it into bit-serial data. This bit-serial data is delivered to each of the two output drivers 144 and 145.

Figure 5:
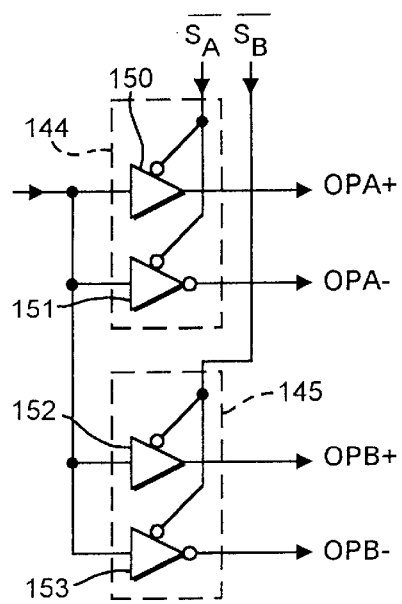
FIG. 5 shows parts of the FIG. 4 component in more detail.

The detailed configuration of the output drivers 144 and 145 is shown in FIG. 5. Each output driver circuit 144 and 145 includes first and second tri-state buffers 150 to 153. The tri-state buffers 150 and 152 are non-inverting buffers, whereas the tri-state buffers 151 and 153 are inverting buffers. Thus, each output driver 144 and 145 provides a differential output OPA or OPB (having two complementary signals OPA+/OPA−; OPB+/OPB−), as is preferable for high-speed data transfer to the switching units.

The tri-state buffers 150 and 151 of the output driver 144 are both controlled by an active-low select signal $\overline{S}_A$. Thus, the two outputs of the output driver 144 are both active when the select signal $\overline{S}_A$ is low, but are otherwise both disabled (in a high-impedance state). The tri-state buffers 152 and 153 of the output driver 155 are both controlled by another active-low select signal $\overline{S}_B$. Thus, the outputs of the output driver 145 are active when the select signal $\overline{S}_B$ is low, but are otherwise disabled (in a high-impedance state). In this embodiment, the select signals $\overline{S}_A$ and $\overline{S}_B$ are provided to the output drivers 144 and 145 by the output controller 146 which is in turn controlled by control information (SEL) provided by the switching controller 20. As described later, however, it is also possible in another embodiment for the output controller to derive the control information "automatically" from an optionally-provided routing tag attached to each cell by the source data unit, as denoted schematically by the dashed-line connection between the transmit input TxIP and the output controller 146 on FIG. 4.

Returning to FIG. 4 once more, the output circuit 16 of each connection unit 12 comprises a receive buffer 161, a serial-to-parallel converter 162 and a data unit interface portion 163. The output circuit 16 receives differential bit-serial data at its receive input $R_xIP$ and buffers the serial data in the receive buffer 161. The serial data is then converted into 16-bit parallel form by the serial-to-parallel converter 162 and is supplied to the data unit interface portion 163. From here it is transferred under the control of the data unit interface portion 163 to the output portion 6 of the connected data unit 2.

Figure 6:
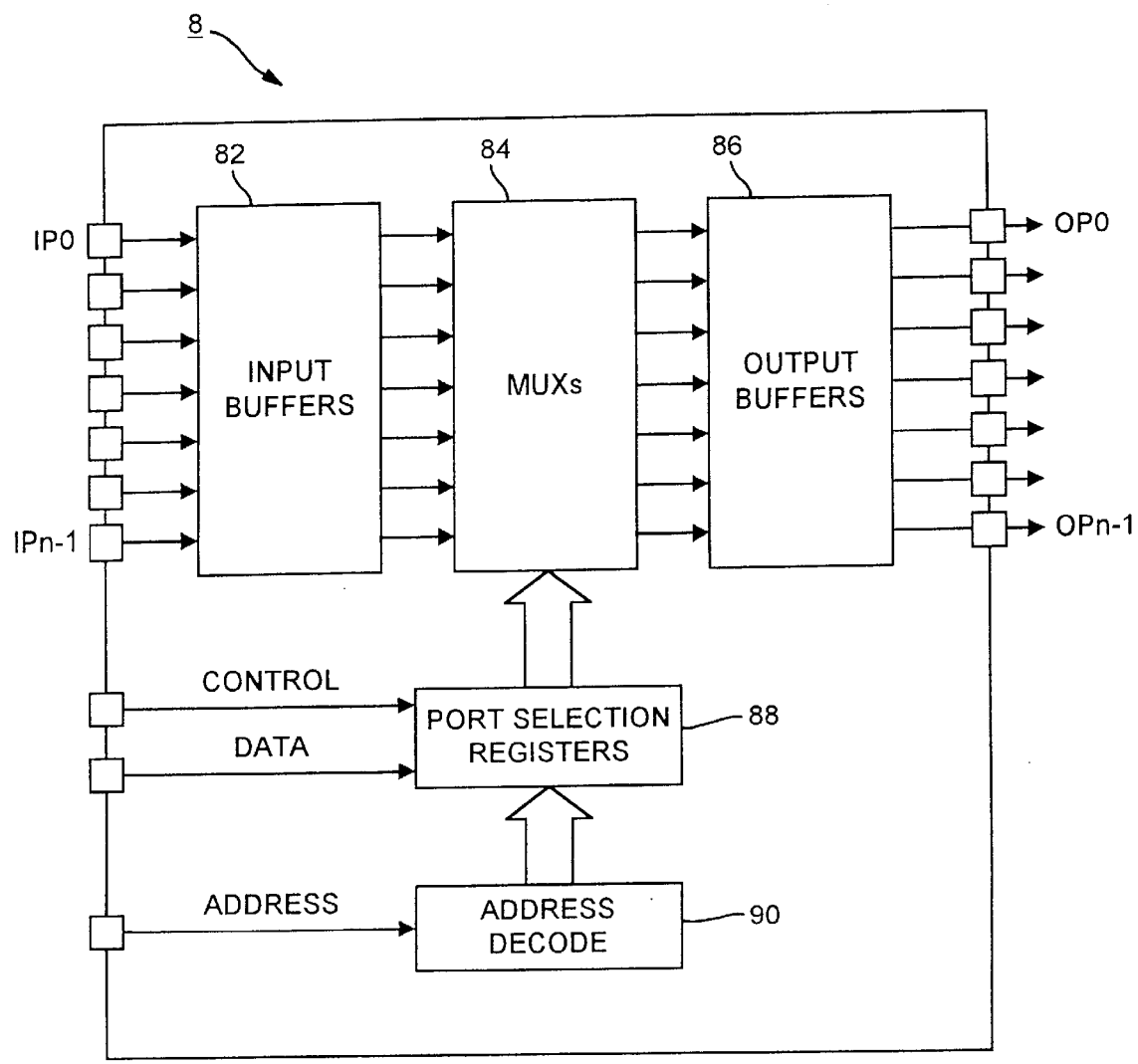
FIG. 6 shows a block circuit diagram of a second component of the FIG. 2 apparatus.

FIG. 6 shows a block diagram of each switching unit 8 used in the FIG. 2 apparatus.

Each switching unit 8 includes a set of input buffers 82, a set of multiplexers 84 and a set of output buffers 86. There is one input buffer 82, one multiplexer 84 and one output buffer 86 per input port IP of the unit. As mentioned previously, because all of the source-destination paths are determined for each switching cycle in advance and all cell queues are implemented in the data units, the input buffers 82 and output buffers 86 are not necessary to deal with output contention problems. However, the buffers 82 and 86 may advantageously be provided to buffer bytes/cells for pipelining/throughput/clock cycle reduction purposes. It is not envisaged the amount of memory required for these purposes would exceed one cell's worth of data.

The switching unit further comprises port selection registers 88 corresponding respectively to the multiplexers 84. An address decoder 90 is provided to control access to the registers 88.

Figure 7:
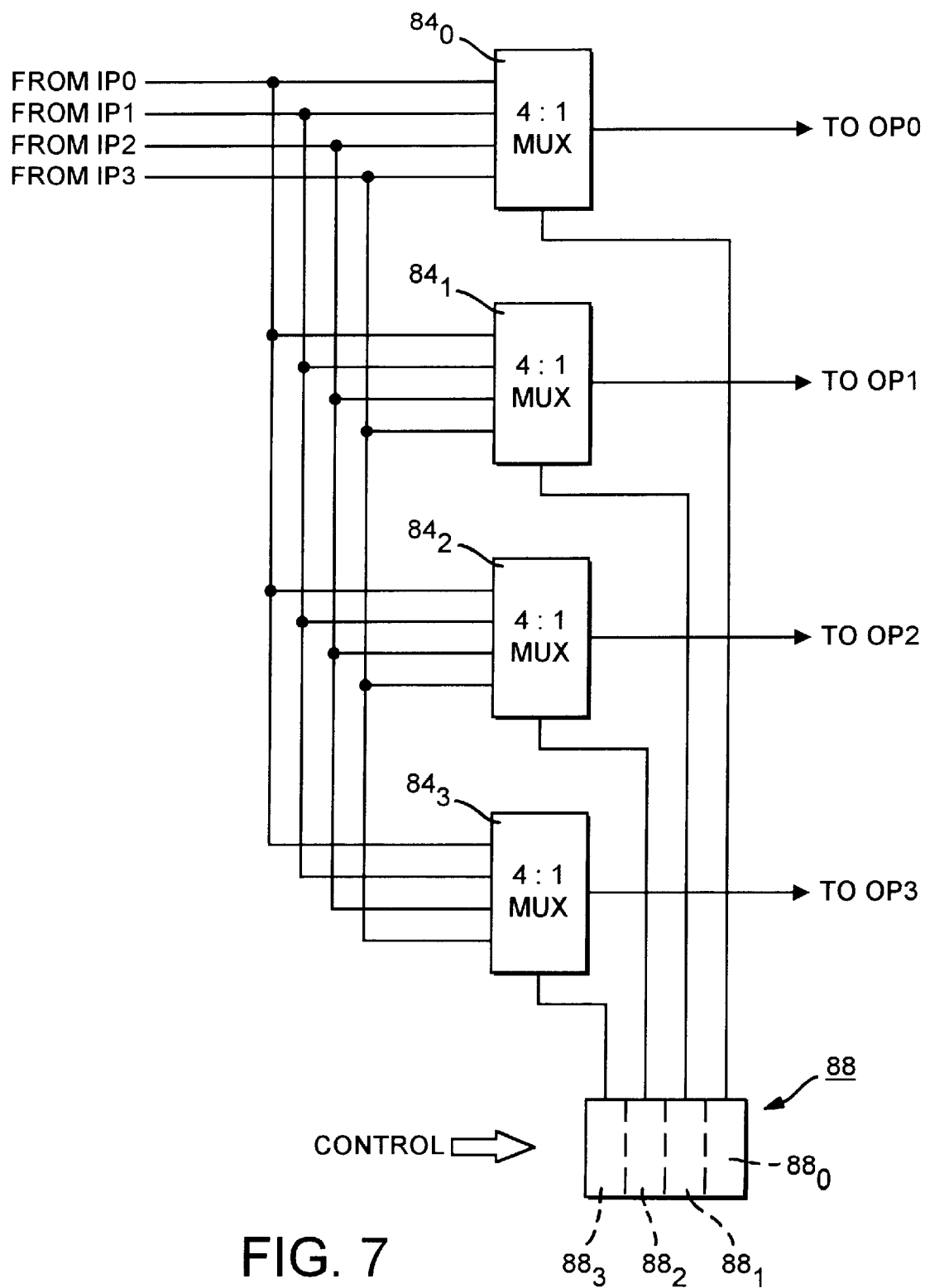
FIG. 7 shows in more detail parts of the FIG. 6 component.

FIG. 7 shows the multiplexers 84 and port selection registers 88 in more detail. For the sake of simplicity, in FIG. 7 it is assumed that the switching unit has only four input ports $IP_0$ to $IP_3$ and four output ports $OP_0$ to $OP_3$. In this case there are four multiplexers $84_0$ to $84_3$, each having four inputs and a single output. The four input ports $IP_0$ to $IP_3$ of the switching unit are connected (via respective input buffers $82_0$ to $82_3$ not shown in FIG. 7) to the multiplexer inputs such that each of the four inputs of each multiplexer receives data from a different one of the input ports $IP_0$ to $IP_3$. The respective outputs of the multiplexers $84_0$ to $84_3$ are connected (via respective output buffers $86_0$ to $86_3$ also not shown in FIG. 7) to respective output ports $OP_0$ to $OP_3$ of the switching unit.

Each multiplexer $84_0$ to $84_3$ is connected to an associated port selection register $88_0$ to $88_3$. In accordance with control information stored in its associated port selection register 88, each multiplexer 84 connects one of its inputs to its output, thereby providing a data transfer path from one of the input ports IP of the switching unit 8 to one of the output ports OP of the switching unit.

It will be appreciated that, in addition to permitting each input port to be connected to an individually-corresponding one of the output ports, the configuration shown in FIG. 7 also permits an input port to be connected at the same time to two or more different output ports as may be required to implement "multicasting", as described later in the present specification.

Returning to FIG. 6, the control information stored in the port selection registers 88 can be changed by the switching controller 20 which first selects which port selection register 88 is to be updated, by supplying address information to the address decoder 90, and then supplies the appropriate new control information to the selected port selection register 88.

As described above, the switching controller 20 may control the switching fabric components directly to set up the required source-destination paths in each switching cycle. However, it is also possible for the switching fabric components to be controlled indirectly by the switching controller. This can be achieved by attaching to each cell that is to be transferred through the switching fabric a routing tag specifying the cell's destination data unit. In this case, the switching units 8 and connection units 12 read the routing tag information received with each cell as it passes through them, and hence these units can be "self-routing"; in other words, each switching unit 8 employs the routing tag information to establish the appropriate internal input port-output port connections, and each connection-unit input circuit 14 employs that information to select which of its two serial outputs to enable.

Figure 8:
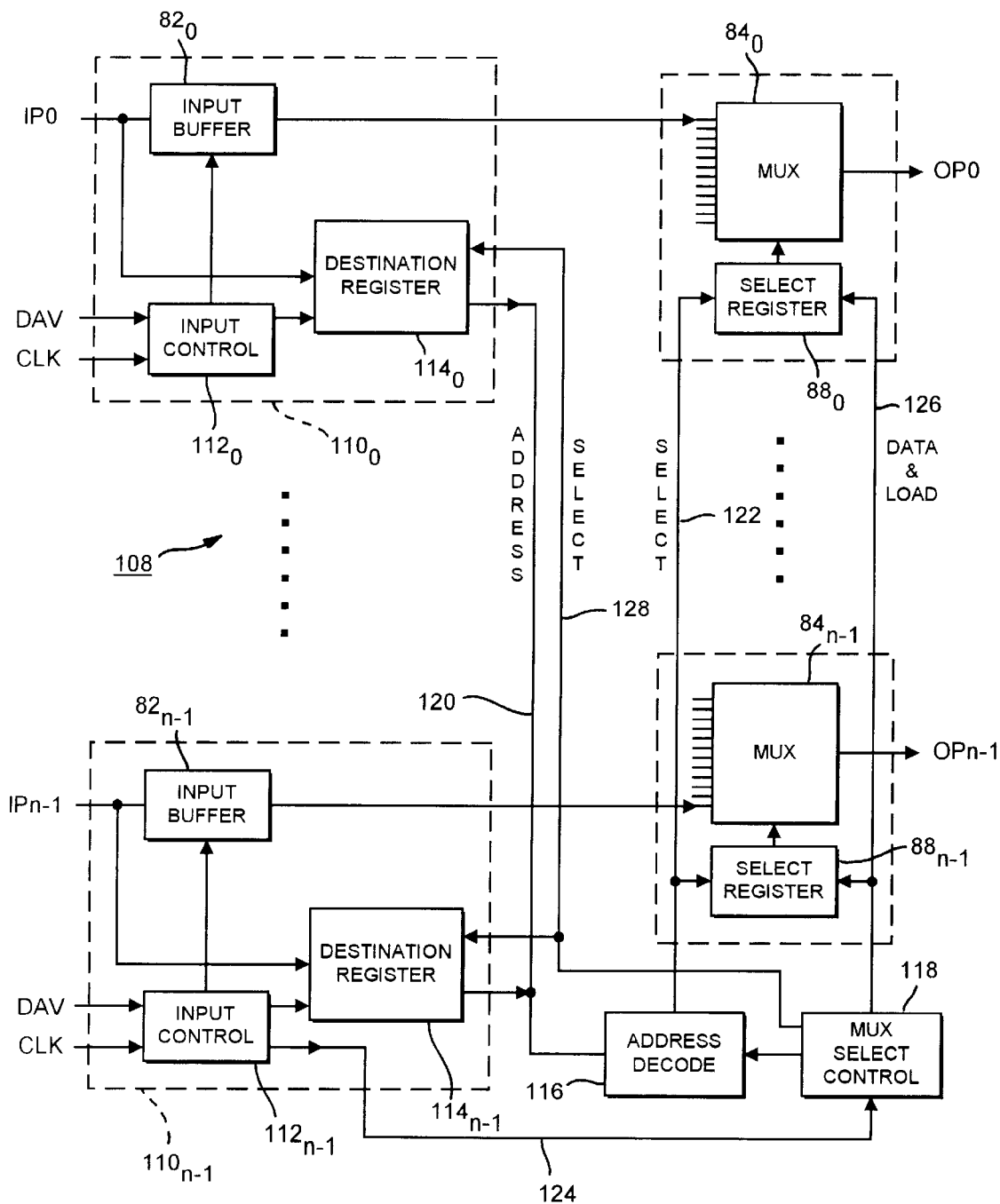
FIG. 8 shows a block diagram of a first alternative implementation of the FIG. 6 component.

FIG. 8 shows a block diagram of parts of a cross-connect switching unit 108 which is self-routing in dependence upon routing tag information.

Components of the FIG. 8 self-routing switching unit 108 which are the same as, or correspond substantially to, components of the FIG. 6 switching unit 8 are denoted by the same reference numerals. Thus, as in the FIG. 6 switching unit, the FIG. 8 switching unit 108 has, for each of its n input ports, an input buffer 82, a multiplexer 84, an output buffer (not shown but similar to the output buffer 86 in FIG. 6) and a port selection register 88. Each input port $IP_0$ to $IP_{n-1}$ in FIG. 8, however, is further provided with a routing circuit $110_0$ to $110_{n-1}$. This routing circuit includes the input buffer 82 for the input port concerned, as well as an input controller 112 and a destination register 114.

The switching unit 108 further includes an address decoder 116 and a routing controller 118. The address decoder 116 is connected to each of the destination registers $114_0$ to $114_{n-1}$ by a routing information bus 120, and is also connected to each of the port selection registers $88_0$ to $88_{n-1}$ by a port selection register select bus 122. The routing controller 118 is connected to the input controller 112 of each routing circuit 110 (for the sake of clarity, only the connection to the input controller $112_{n-1}$ is shown in FIG. 8), and is also connected to each of the port selection registers $88_0$ to $88_{n-1}$ by data and control buses 126 and to each of the destination registers $114_0$ to $114_{n-1}$ by a destination register select bus 128. The routing controller 118 is also connected to the address decoder 116.

Figure 9:
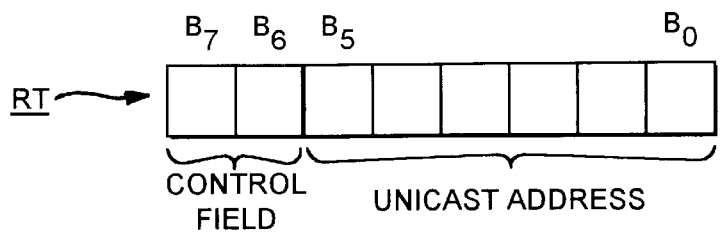
FIG. 9 shows a first exemplary format of a routing tag used in the FIG. 2 apparatus.

Operation of the FIG. 8 switching unit will now be described. It is again assumed that the switching apparatus in which the switching unit 108 is used is operating synchronously and performing a series of switching cycles. Each cell arriving at one of the input ports of the switching unit 108 has a routing tag attached to it. FIG. 9 shows an example of the format of the routing tag. In this case, the tag is a single byte in length and is attached to the start of the cell to which it relates, i.e. the routing tag byte is the first byte and is followed by the bytes of the cell itself. As shown in FIG. 9, the routing tag byte has an address field, made up of the six lower-order bits $B_0$ to $B_5$, and a control field made up of the two highest-order bits $B_6$ and $B_7$. The six bits of the address field enable up to 64 different destination data units to be specified. The control field is used to identify the start of a data packet (i.e. routing tag byte and cell bytes) received from a source data unit 2.

When a cell with attached routing tag is received at an input port of the switching unit 108, the routing tag byte from the cell is stored in the destination select register 114 of the routing circuit 110 for that input port. This operation is performed in parallel for each input port, so that the respective routing tags of all the cells that will be transferred in the current switching cycle are stored in the destination registers $114_0$ to $114_{n-1}$ as soon as the first byte of the data packet (i.e. the routing tag byte) has been received.

As the remaining bytes of the data packet (i.e. the bytes of the cell itself) continue to be received they are stored in the input buffer 82 of the routing circuit 110. Whilst these bytes are being stored, the routing controller 118 reads each destination register $114_0$ to $114_{n-1}$ in turn, starting with destination register $114_0$ and finishing with destination register $114_{n-1}$.

The routing controller selects the destination register 114 to be read by transmitting select signals to the destination registers via the destination register select bus 128, and the routing tag information stored in the selected destination register is then delivered via the routing information bus 120 to the address decoder 116. The address decoder 116 converts the received routing tag information into a port selection register address which is delivered to all the port selection registers $88_n$ to $88_{n-1}$ via the port selection register select bus 122. This port selection register address designates one of the port selection registers $88_0$ to $88_{n-1}$ in accordance with the routing tag information. At the same time as the port selection register address is supplied to the port selection registers 88, the routing controller 118 supplies control information to those registers using the data and control bus 126. This control information specifies which of the n inputs of the multiplexer 84 controlled by the designated port selection register is to be selected, i.e. which multiplexer input is to be connected to the multiplexer output. As the n inputs to each multiplexer 84 are connected respectively to the n routing circuits $110_0$ to $110_{n-1}$, the required control information is simply the number of the particular routing circuit whose destination register has just been read. The routing controller 118 then applies a load signal to the port selection registers via the data and control bus 126 in response to which the port selection register designated by the port selection register address stores the control information. The other port selection registers do not store the control information.

If, for example, destination register $114_0$ in routing circuit $110_0$ for input port $IP_0$ contains "7" (i.e. the routing tag of the cell currently being received at the input port $IP_0$ specifies that the cell is to be routed to the destination data unit $2_7$), then the address decoder 116 produces a port selection address "7" designating the port selection register $88_7$ and the routing controller 118 outputs the control information "0" on the data and control bus 126 so that the port selection register $88_7$ for the output port of $OP_7$ stores the control information "0" corresponding to the currently-processed routing circuit $110_0$. In this way, a data transfer path is established from input port $IP_0$ to output port $OP_7$.

The routing controller 118 then reads the content of the destination register $114_1$ in the next routing circuit $110_1$ for input port $IP_1$. If the routing tag stored in this register specifies the destination data unit $2_x$, then the address decoder 116 designates the port selection register $88_x$ and writes the control information "1" into it, thereby establishing another data transfer path, from input port $IP_1$ to output port $OP_x$. This procedure is repeated until all of the input ports have been routed to their respective destination output ports.

As there are n inputs, the cell-routing process will take n+1 clock cycles. As there are 53 bytes in an ATM cell, provided that n<53 all of the input-output paths can be established before all of the bytes of the cell have been received at each input port.

As soon as the data transfer paths have been established by the routing controller 118, the cell data can start to be transferred from the input buffers $82_0$ to $82_{n-1}$ to the inputs of the multiplexers $84_0$ to $84_{n-1}$. This data is then transferred by each multiplexer $84_0$ to $84_{n-1}$ from the multiplexer input specified by the connected port select register $88_0$ to $88_{n-1}$ to the multiplexer output, and hence to the appropriate output port for the destination data unit.

It will be appreciated that, when the routing controller 118 operates in the manner described above, it is necessary for the input buffer 82 in each routing circuit 110 to have a capacity greater than one cell's worth of data. For example, it may be necessary for each input buffer to have a capacity equal to two cell's worth of data. However, the capacity of each of the input buffers should preferably be minimised in order to reduce the area occupied on the chip.

Figure 10A:
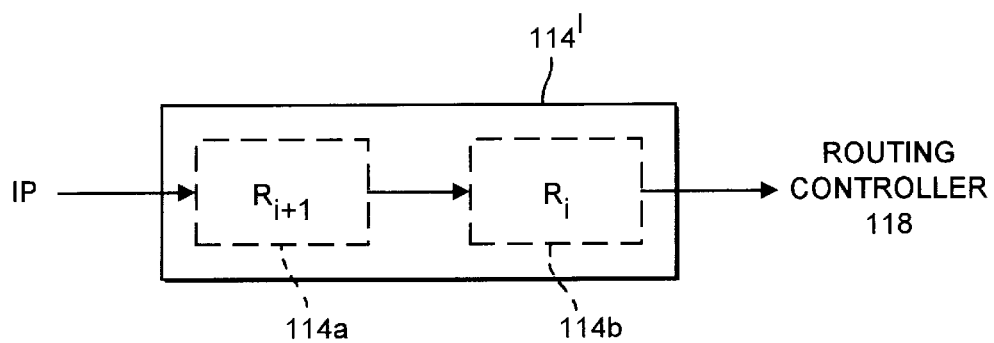
FIGS. 10(A) and 10(B) show schematic diagrams for use in explaining a modification to the FIG. 8 component.

To overcome this problem, it is possible to employ a different cell-routing process in which the data transfer paths are established before the cells arrive. This is achieved by having each data unit use the routing tag of each cell $C_i$ to supply (feed forward) the routing information $R_{i+1}$ not for that cell $C_i$ but for the next cell $C_{i+1}$ that the data unit concerned will supply to the same switching-unit input port. This feed-forward cell-routing process requires each of the destination registers $114_0$ to $114_{n-1}$ to be replaced by a "double-buffered" destination register 114', as shown in FIG. 10(A). This double-buffered destination register 114' comprises input and output registers 114a and 114b, the output register 114b holding the routing information $R_i$ for the current cell $C_i$ whilst the routing information $R_{i+1}$ for the next cell $C_{i+1}$ is received by the input register 114a. Once all the data of the current cell has been transferred, the routing information for the next cell is transferred from the input register to the output register.

At the start of the cell-routing process (cf. FIG. 10(B)) the destination registers $114'_0$ to $114'_{n-1}$ for the input ports need to be initialised. This is achieved by each data unit 2 sending a dummy cell DC having an attached routing tag $RT_{DC}$, specifying the routing information $R_{C1}$ for the next cell (first actual data cell) C1 which that data unit will be transmitting to the same input port, and also having a null payload. This dummy DC cell could alternatively be a special initialisation cell. The routing information $R_{C1}$ carried by the dummy cell is received in the input register 114a of the double-buffered destination register 114' for the input port concerned. This routing information $R_{C1}$ is transferred immediately from the input register 114a to the output register 114b of the destination register concerned. These operations are carried out in parallel for all the input ports.

The routing controller 118 then reads all of the destination registers in turn (i.e. reads the output registers 114b) and stores the necessary information in the port selection registers $88_0$ to $88_{n-1}$ so as to establish the required data transfer paths before the first actual data cell C1 is received. Thus, as soon as the first actual data cell C1 is received it can start to be transferred to its intended output port. The first data cell C1 carries in its routing tag $RT_{C1}$ the routing information $R_{C2}$ for the second data cell C2 and this information is stored in the input register 114a of the double-buffered destination register 114' whilst transfer of the data of the first data cell C1 is continuing. As soon as the output register 114b of each double-buffered destination register 114' has been read by the routing controller 118 the second-data-cell routing information $R_{C2}$ (received with the first data cell C1) is transferred from the input register 114a to the output register 114b of the destination register concerned. In this way, the required data transfer paths for the second set of data cells can be established as soon as transfer of the first set of data cells has been completed.

The feed-forward cell-routing process described above is only suitable for use in switching apparatus in which each switching-unit input port always receive data from the same data unit, as in the FIG. 1 switching apparatus. If an input port can receive data from two or more different data units, as is possible in the FIG. 2 switching apparatus, it is not known from which source the next data packet will come, making it impossible to feed forward the routing information for that packet.

Figure 11:
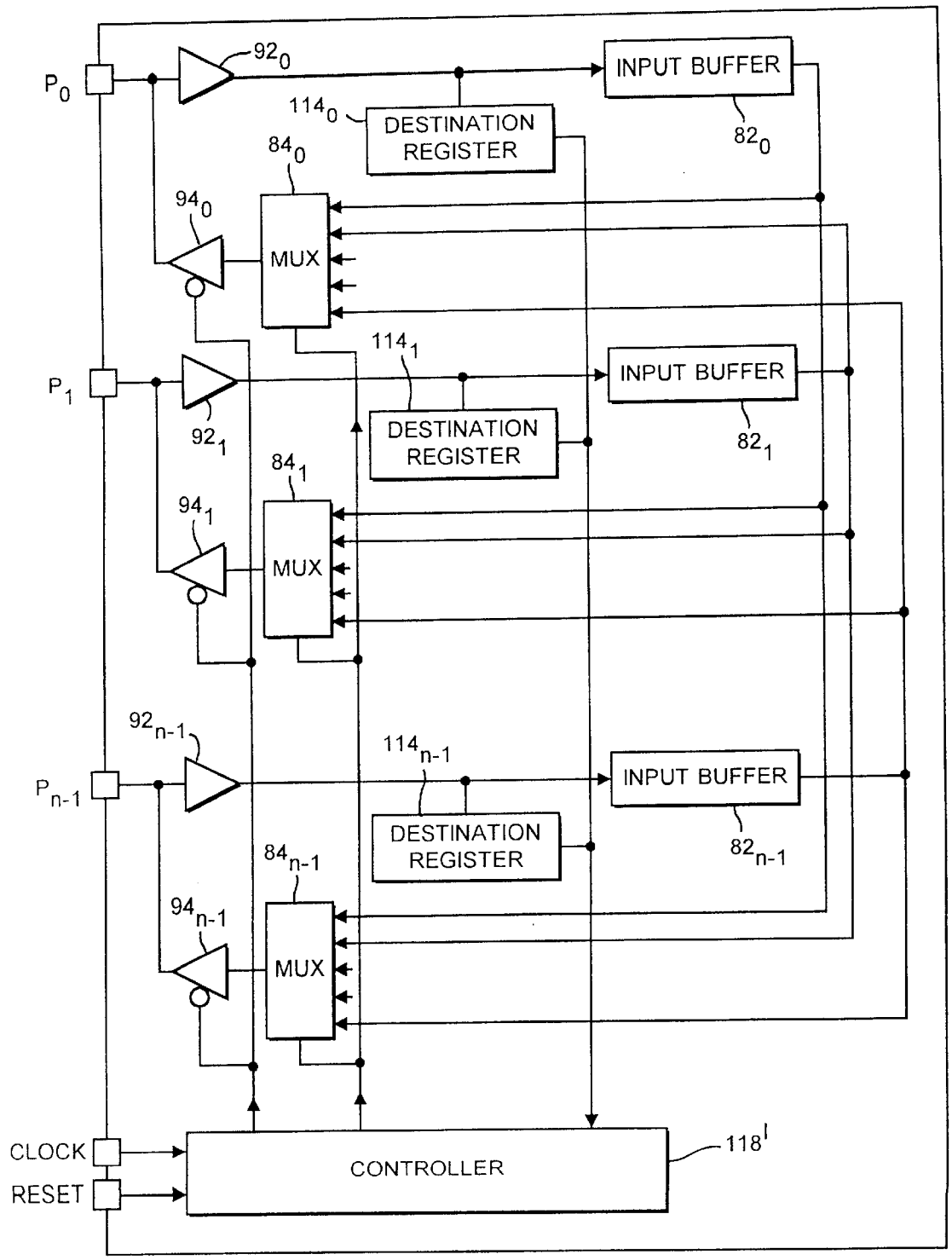
FIG. 11 shows a block diagram of a second alternative implementation of the FIG. 6 component, according to the above-mentioned third aspect of the invention.

FIG. 11 shows a block diagram of part of another cross-connect switching unit 208 which, like the cross-connect switching unit 108 of FIG. 8, is self-routing in dependence upon routing tag information. Components of the FIG. 11 self-routing switching unit 208 which are the same as, or correspond substantially to, components of the FIG. 8 switching unit 108 are denoted by the same reference numerals.

Figure 10:
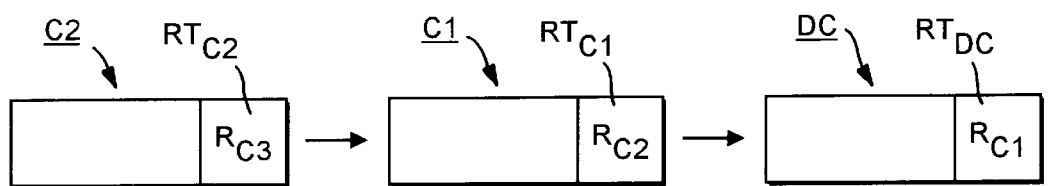

The switching unit 208 of FIG. 11 differs from the FIG. 8 switching unit 108 in that, instead of having separate input ports IP and output ports OP, the FIG. 10 switching unit only has bidirectional ports $P_0$ to $P_{n-1}$. Each bidirectional port P is connected via a buffer 92 to the input buffer 82 associated with that port and to the destination register 114 associated with that port. In addition, each multiplexer 84 is connected via a tri-state buffer 94 to one of the ports P.

The switching unit 208 further comprises a controller 118' which performs not only the function of the routing controller 118 in the FIG. 8 switching unit 108 but also an input/output control function.

The switching unit 208 in FIG. 11 operates in basically the same manner as the switching unit 108 of FIG. 8. However, when employed in switching apparatus, for example the FIG. 2 switching apparatus, the apparatus needs to have two phases (input and output phases) in one switching cycle. In the input phase the ports P of the switching unit 208 are employed as input ports and each data-unit input portion 4 transfers a data packet (cell) via one of the connection-unit input circuits 14 to one of the ports P. These cells are stored internally in the input buffers $82_0$ to $82_{n-1}$ of the switching unit 208. The output port selections for these cells are made as the cells are written into the input buffers based on the routing information carried in the cell routing tags, as previously described. During this input phase of the switching cycle the controller 118' disables the tri-state buffers $94_0$ to $94_{n-1}$, so that the multiplexers $84_0$ to $84_{n-1}$ are isolated from the bidirectional ports $P_0$ to $P_{n-1}$.

Then, during the output phase of the switching cycle, the bidirectional ports are employed as output ports and the cells are transferred from the input buffers $82_0$ to $82_{n-1}$ to their respective determined ports P via the multiplexers $84_0$ to $84_{n-1}$ and the tri-state buffers $94_0$ to $94_{n-1}$ which at this time are enabled by the controller 118'.

It will be appreciated that, in order to provide the same data transfer rate as the FIG. 8 switching unit 108, the FIG. 11 switching unit 208 must be capable of operating at twice the sum of the respective line rates (UNI line rates) of the data ports connected with the data units 2. The connection units 12 must also be capable of operating at this double rate. For example, if the sum of the UNI line rates is 622 Mbits/s, then the switching unit 208 and connection units 12 would have to be operable at 1.2 Gbits/s.

The FIG. 11 switching unit 208 has the advantage over the switching unit 108 of FIG. 8 of having only half the total number of ports.

In other embodiments, a switching unit which has bidirectional ports but which is not self-routing can be used. It is also possible to employ the switching unit 208 of FIG. 11 (with or without the self-routing feature) in the FIG. 1 apparatus in place of the switching unit 8.

In the FIG. 2 apparatus it is desirable to be able to carry out so called "multicasting", in which data received at one of the data ports DP is sent to a plurality of other data ports.

There are a number of ways in which provision can be made for such multicasting. For example, it is possible to designate one of the switching cycles as a dedicated multicast cycle in which a source data unit outputs one or more cells to a group of destination data units. In order to avoid contention at the input ports or output ports of the switching units, it will generally only be possible for one or a limited number of source data units to multicast in the same multicast cycle. Thus, in this method the data units will be allocated multicast cycles individually or in small groups in turn.

In this method of performing multicasting, the configurations of the connection units 12 and switching units 8 in the multicast cycles may be controlled by the switching controller 20, as described hereinbefore with reference to FIG. 2.

Figure 12:
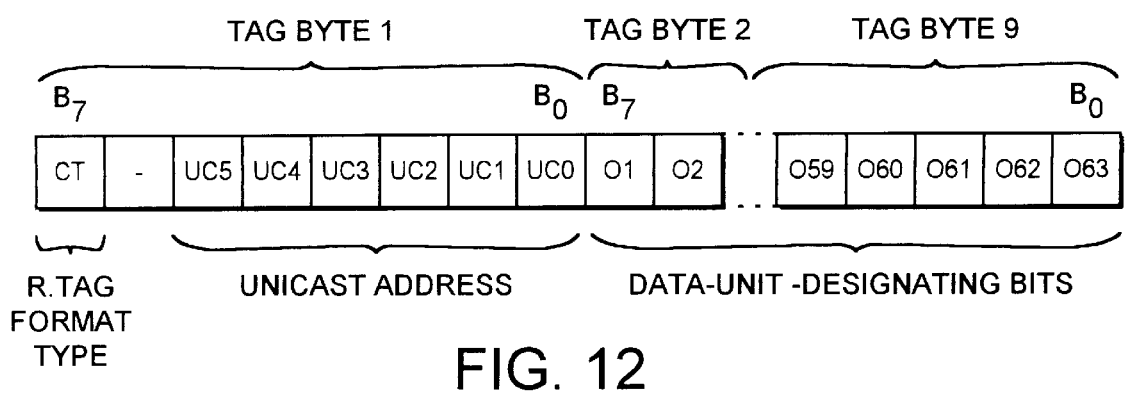
FIG. 12 shows a further exemplary format of the routing tag.

On the other hand, when self-routing switching units 108 and 208, as described with reference to FIGS. 8 and 11, are employed in the switching apparatus, it is necessary to adopt a different routing tag format from the one shown in FIG. 9. In this different routing tag format, shown in FIG. 12, the routing tag is of variable length (one byte long or nine bytes long). The most-significant bit of the first byte is a cast-type bit CT indicating whether the cell to which the routing tag concerned is attached is to be unicast (i.e. sent to just a single destination data unit) or multicast (sent to a plurality of destination data units). If the cast-type bit CT is reset (0), this denotes a unicast cell and in this case the routing tag is only one byte in length. The lower-order six bits $UC_0$ to $UC_5$ of the single-byte routing tag specify the destination data unit for the unicast operation.

If, on the other hand, the cast-type bit CT is set (1) this denotes a multicast cell and the routing tag is nine bytes in length. The final eight bytes of the routing tag provide 64 data-unit-designating bits $O_0$ to $O_{63}$ corresponding respectively to the 64 different possible destination data units in FIG. 2. Each of these bits designates, when set, that its corresponding destination data unit is to receive the multicast cell.

As described previously with reference to FIG. 8, the multicast routing tag is received, attached to the cell to which it relates, at one of the input ports of one of the self-routing switching units 108 and is stored in the destination register 114 of the routing circuit 110 for that input port. The routing controller 118 determines from the cast-type bit CT that the routing tag concerned is a multicast routing tag and identifies from the data-unit-designating bits $DU_0$ to $DU_{63}$ contained in the final eight bytes of the routing tag which destination data units need to receive the multicast cell. The routing controller 118 causes the address decoder 116 to apply in turn, to the port selection register select bus 122, port selection register addresses designating respectively the port selection registers 88 that control the multiplexers 84 required to route the multicast cell data to the designated destination data units. At the same time, the number of the particular routing circuit 110 whose destination register 114 has just been read is output on the data and control bus 126 by the routing controller as the control information for storage in the port selection registers, as described hereinbefore with reference to FIG. 8. As each different port selection register is designated in turn by the address decoder 116, the routing controller 118 applies a load signal to the data and control bus 126 so that the designated port selection register stores the control information. In this way, the multiplexers 84 controlled by the designated port selection registers are all programmed to receive data from the same routing circuit, being the routing circuit at which the multicast cell was received.

In the above-described method of implementing multicasting with self-routing cross-connect switches the data packet (routing tag and ATM cell data) is different in length when multicasting is occurring than when unicasting is being performed. This means that the multicast cycles will need to be of longer duration than other switching cycles used only for unicasting. In practice, the different transfer times for unicast cells and multicast cells can be accommodated by using a data valid (DAV) signal which is applied to the input controller 112 of each routing circuit 110 in the switching units 108, the data valid signal being generated by the source data unit 2.

Figure 13:
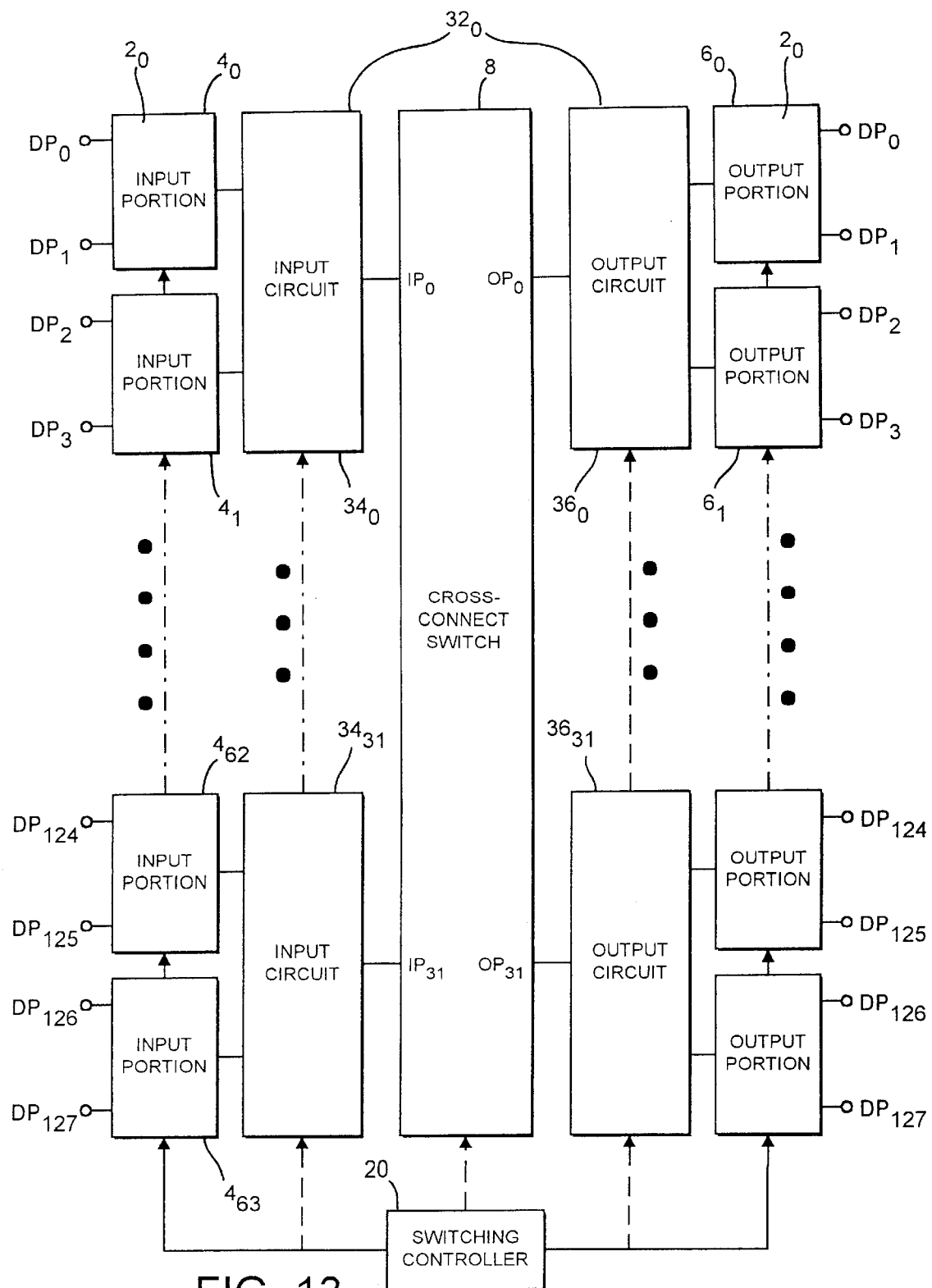
FIG. 13 shows a block diagram of parts of another ATM switching apparatus embodying the aforesaid first aspect of the present invention.

FIG. 13 shows a block diagram of parts of ATM switching apparatus according to a second embodiment of the present invention. Components of the FIG. 13 apparatus which are the same as, or correspond substantially to, components of the FIG. 2 apparatus are denoted by the same reference numerals. In the FIG. 13 apparatus the connection units $32_0$ to $32_{31}$ are different from the connection units 12 used in the FIG. 2 apparatus and each of them is connected to two different data units. The two data units connected to each connection unit together constitute a data delivery group for an associated input port IP of the switching unit 8, and there is one connection unit per data delivery group. For example, the data units $2_0$ and $2_1$ form a data delivery group for the input port $IP_0$.

Each connection unit 32 still has an input circuit 34 and an output circuit 36, but the input circuit 34 has two inputs for receiving parallel data instead of just one input as in the case of the input circuit 14 in FIG. 2. These two inputs are connected to different respective data-unit input portions 4. The input circuit 34 also has just a single output which is connected to just one of the input ports IP of the switching unit 8. This single output is a serial output (differential output).

The output circuit 36 of each connection unit 32 also differs from the output circuit 16 of the connection unit 12 in FIG. 2. The output circuit 36 has a single serial input connected to a switching-unit output port OP and two outputs, connected to different respective data-unit output portions 6, each for outputting parallel data.

The FIG. 13 apparatus also operates synchronously to perform a series of switching cycles but in this case there are alternate first and second switching cycles.

In each switching cycle, each input circuit 34 can receive data simultaneously from the respective input portions 4 of both data units of the data delivery group. For example, the input circuit $34_0$ can receive parallel data from the input portions $4_0$ and $4_1$ simultaneously. Incidentally, as previously described, the receive queue of each of these two input portions which is permitted to transfer its data to the switching fabric in the switching cycle concerned is determined by the switching controller 20 which applies appropriate control information to the local scheduler in each data-unit input portion. The use of the local scheduler reduces the burden on the switching controller 20.

In each first switching cycle, the parallel data received at the first parallel input of each input circuit 34 from the input portion 4 of the first data unit of the data delivery group concerned (i.e. the data units $2_0$, $2_2$, $2_4$, etc.) is converted into bit-serial form by the input circuit 34 and output at the serial output to the associated input port IP of the switching unit 8. Depending upon the configuration of the switching unit 8, this serial data is output at one of the output ports of the switching unit and reaches one of the output circuits 36. This output circuit 36 converts the serial data into parallel data once more and outputs it to one of its two outputs (depending on the required destination data unit).

Take, for example, a situation in which data has been received at data port $DP_0$ and stored in source data unit $2_0$, and the data is destined for data port $DP_{127}$ so that it must be transferred by the switching fabric to destination data unit $2_{63}$. Such a transfer of data is possible in one of the first switching cycles because in the first switching cycles the input circuit $34_0$ outputs data received at the first of its two parallel inputs (which is the input connected to the input portion $4_0$ of the first data unit $2_0$ of the data delivery group made up of the data units $2_0$ and $2_1$). The input circuit $34_0$ converts the parallel data into bit-serial form. The switching controller 20 configures the switching unit 8 so that the input port $IP_0$ thereof is connected to the output port $OP_{31}$ in the present (first) switching cycle. The switching controller 20 also configures the output circuit $36_{31}$ connected to the output port $OP_{31}$ to pass the received data, after converting it back into parallel form, to the second of its two parallel outputs, which second output is connected to the output portion $6_{63}$ of the destination data unit $2_{63}$. This output portion then delivers the data to the required destination data port $DP_{127}$.

In each second switching cycle each input circuit 34 outputs data received at its second parallel input, for example in the case of the input circuit $34_0$ the input connected to the input portion $4_1$ of the second data unit $2_1$ of the data delivery group made up of the data units $2_0$ and $2_1$. The data is again output in bit-serial form, via the serial output, to the connected switching-unit input port IP. The switching-unit configuration is changed for the second switching cycle, as necessary, to provide a different set of data transfer paths for the data from the set of data transfer paths provided in the preceding first switching cycle. Also each output circuit 36 is reconfigured, as necessary, in the second switching cycle to output the data received from the switching-unit output port to which it is connected at the appropriate one of its two outputs.

Take, for example, the situation in which data has been received at data port $DP_{126}$ (source data unit $2_{63}$) that is to be transferred to data port $DP_2$ (destination data unit $2_0$). Such a transfer is possible in one of the second switching cycles because the input circuit $34_{31}$ outputs data received at the second of its two inputs in each second switching cycle, which second input is connected to the input portion $4_{63}$ of the second data unit $2_{63}$ of the data delivery group made up of the data units $2_{62}$ and $2_{63}$. The switching controller 20 configures the switching unit 8 to provide a data transfer path from its input port $IP_{31}$ to its output port $OP_0$. Thus, the data is received by the output circuit $36_0$. The switching controller 20 has also configured the output circuit $36_0$ to output data received at its serial input to the second of its two parallel outputs in the second switching cycle concerned. Accordingly, the data is transferred to the output portion $6_1$ of the required destination data unit $2_1$ and hence to the required destination data port $DP_2$.

The output-circuit configuration and switching-unit configuration can also be controlled locally by using routing tags attached to the data packets by the source data units, instead of the switching controller controlling these configurations.

In the FIG. 13 apparatus the connection units are again such that the data units are formed into data delivery groups. Because the connection units serve a time-division-multiplexing function the data received by each connection unit from one data unit of a data delivery group is delivered to the switching-unit input port for that group at a different time from the data received by that connection unit from the other data unit of the group.

It will be appreciated that in the FIG. 13 apparatus, use of such data delivery groups enables the total number of switching-unit input ports and output ports to be half that of the FIG. 2 apparatus for the same number of data units. Thus, in the FIG. 13 apparatus it is possible to make use of only a single switching unit, whereas two units were required in FIG. 2. Furthermore, the input circuits 34 in FIG. 13 have only half the number of outputs as the input circuits 14 in FIG. 2, so halving the output pin count.

To achieve the same throughput of data in the FIG. 13 apparatus as in the FIG. 2 apparatus, however, it is necessary for the switching unit 8 and the connection units 32 to be capable of operating at double the rate of the switching units $8_1$ and $8_2$ and connection units 12 in FIG. 2, because there are half the number of simultaneously data transfer paths in the FIG. 13 apparatus.

This means that the transfer of each data packet in the FIG. 13 apparatus must be completed in half the time of each transfer in the FIG. 2 apparatus to achieve the same throughput. In other words, each (first or second) switching cycle in FIG. 13 must be half as long as each switching cycle in FIG. 2 so that the first data unit of each data delivery group is allocated first switching cycles, and the second data unit of each such group is allocated second switching cycles, at the same rate as in FIG. 2.

If, for example, the data rate of each data unit is 622 Mbits/s, the (serial) data rate for transfers within the switching fabric (i.e. from the connection-unit input circuits 34 via the switching unit 8 to the connection-unit output circuits 36) needs to be 1.2 Gbits/s. Circuitry capable of operating at the latter data rate can be implemented in GaAs technology.

As mentioned previously, it is not essential for the data to be transferred in serial form in the switching fabric, although this is the best solution from the point of view of reducing the number of connection pins per data transfer path. The data could be transferred in parallel form, in 4- or 8-bit-wide units, to permit the switching unit and connection units to operate more slowly, at the expense of more connection pins per data transfer path.

Figure 14:
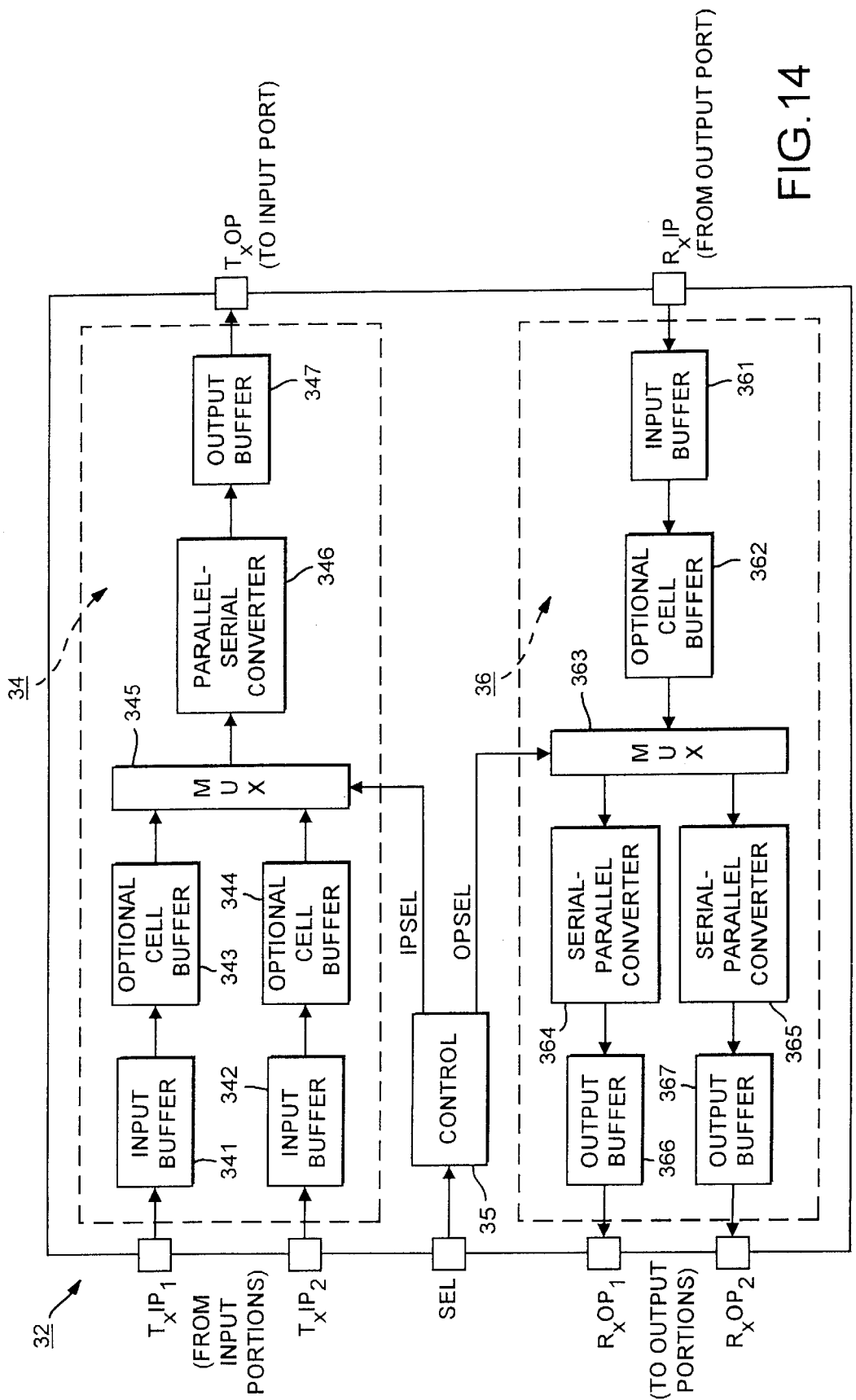
FIG. 14 shows a block circuit diagram of one component of the FIG. 13 apparatus, which component embodies the said second aspect of the present invention.

FIG. 14 shows a block circuit diagram of one of the connection units 32 of the FIG. 13 switching apparatus. This connection unit 32 comprises, in addition to the input circuit 34 and output circuit 36, a control circuit 35 connected to both the input and output circuits 34 and 36. The control circuit 35 has a selection input SEL for connection to the switching controller 20 to receive control information therefrom.

The input circuit 34 comprises input buffers 341 and 342 connected respectively to the first and second parallel data inputs $TxIP_1$ and $TxIP_2$ of the connection unit. These two parallel data inputs are connected respectively to the input portions 4 of the two data units of one of the data delivery groups. Data received at each parallel input is held temporarily in the input buffers 341 and 342.

The input circuit 34 further comprises cell buffers 343 and 344 connected respectively to outputs of the input buffers 341 and 342. The cell buffers 343 and 344 are optional but, if provided, serve to hold up to one cell's worth of data received at the relevant parallel input $TxIP_1$ or $TxIP_2$ of the connection unit. Respective outputs of the cell buffers 343 and 344 are connected to a multiplexer 345 which selects one of the two outputs in accordance with an input selection signal IPSEL applied to the multiplexer 345 by the control circuit 35. The signal IPSEL is changed by the control circuit 35 after each switching cycle so that during each first switching cycle the output of the cell buffer 343 is selected by the multiplexer 345, and during each second switching cycle the output of the cell buffer 344 is selected by the multiplexer 345.

The input circuit further comprises a parallel-serial converter 346 whose parallel input is connected to an output of the multiplexer 345. The parallel-serial converter 346 converts the parallel data received from the multiplexer 345 into bit-serial data and outputs it to an output buffer 347. The output buffer 347, which may be a differential output driver circuit such as the circuit 144 or 145 shown in FIG. 5, delivers the serial data to an output terminal TxOP of the connection unit 32.

The output circuit 36 of the connection unit 32 comprises an input buffer 361 which is connected to a serial input RxIP of the connection unit 32. This serial input is connected to one of the switching-unit output ports. The input buffer buffers the incoming serial data from that output port and passes it to a cell buffer 362 which, like the cell buffers 343 and 344 in the input circuit 34, has a capacity of up to one cell's worth of data. The cell buffer 362 is optional.

The output circuit 36 further comprises a multiplexer 363 which receives the serial data from the cell buffer 362. The serial data is output by the multiplexer 363 at one of its two outputs in accordance with an output selection signal OPSEL applied thereto by the control circuit 35. The selection signal OPSEL is changeable in accordance with externally-applied control information SEL received by the control circuit 35 from the switching controller 20. Alternatively, or in addition, the selection signal OPSEL may be controlled by the control circuit 35 in dependence upon routing information carried by each cell received at the input buffer 361, so as to implement self-routing, as shown schematically in FIG. 14 by the dashed line connecting the input buffer 361 to the control circuit 35.

The two outputs of the multiplexer 363 are connected to respective serial-parallel converters 364 and 365, each of which converts the serial data received thereby into parallel data and outputs it to an output buffer 366 or 367. The output buffers 366 and 367 deliver the parallel data to respective parallel outputs $RxOP_1$ and $RxOP_2$ of the connection unit 32. These parallel outputs are connected respectively to the output portions 6 of the two data units of the data delivery group associated with the connection unit 32.

The switching unit 8 of FIG. 13 (as shown in FIGS. 6 and 7) can be replaced by the switching unit 108 of FIG. 8 or the switching unit 208 of FIG. 11 (the unit 208 with or without the self-routing feature).

In the FIG. 13 apparatus the number of inputs of each input circuit 34 is not limited to two. For example, each input circuit could have four inputs for connection to different respective data-unit input portions 4, i.e. each data delivery group would have four data units. In this case each output circuit 36 would have four outputs for connection to different respective data-unit output portions 6, and the apparatus would need to have repetitive first, second, third and fourth switching cycles, the serial output rate of each input circuit 34 being four times the data rate at each parallel input. This would lead to further reductions in the numbers of input ports and output ports in the switching unit provided that the connection units and switching unit used are capable of operating at the increased serial data rate.

In the FIG. 13 embodiment as described above, the data units all share the switching resources equally. However, there may be situations in which equal shares do not provide the necessary fairness of resource allocation as between the different data units. For example, if the first of the two data units of a data delivery group operates at a higher data rate than the second, then, in a preselected sequence of switching cycles for that group, the first data unit can be allocated more first switching cycles than the second data unit is allocated second switching cycles. When, say, the first data unit operates at a data rate of 622 Mbits/s and the second data unit operates at a data rate of 155 Mbits/s, the connection units can be configured (by the switching controller or by the data units themselves) to repeat a sequence of five switching cycles made up of four first switching cycles and one second switching cycle.

As indicated above, the control circuit 35 controls the configuration of the input circuit 34 of the connection unit 32 in each switching cycle. This control circuit may, for example, include a local scheduler, similar to the local schedulers included in the data units, which stores control information, received from the switching controller or the data units, that is used to set the length and composition of the above-mentioned preselected sequence of switching cycles for the input circuit concerned.

In this arrangement, the switching controller 20 can also change the sequence from time to time, for example if it notes, from monitoring the receive-queue fill levels in the different data units of one data delivery group, that the queues of one data unit are fuller than those of another data unit. Thus, the switching cycle allocations for the data units of a data delivery group can be influenced by actual traffic conditions, so facilitating fairness of resource allocation in the switching apparatus.

It is also possible to combine the FIGS. 2 and 13 architectures. For example, when the number of data units to be supported is relatively large, each connection unit 32 may have (say) four data units connected to it. If there are more connection units than an individual switching unit has input ports (and output ports), then it will be necessary to use two or more switching units. In this case, it is possible for each input circuit 34 to have plural tri-state serial outputs as in the case of the input circuit 14 in FIG. 2, so that respective serial outputs of two or more input circuits can be connected to the same switching-unit input port. The output circuits 36 would each still just have one serial input connected to one of the switching-unit output ports.

Because the connection units 12 and 32 used in embodiments of the invention are relatively small in scale and include only simple circuit elements it is conceivable to duplicate some or all of the circuit elements within each unit (hence providing redundancy) without increasing the unit cost significantly. This is useful for wide-area network (WAN) applications which require such duplication to enable faulty components to be bypassed in the event of a fault. In a WAN the network operator obtains his revenue on the basis of the number of calls connected; if a line is down revenue will be lost, and further penalties may be incurred, particularly if the calls relate to important financial transactions. Accordingly, identifying faults and re-routing calls quickly is extremely important in such WAN applications. As the connection-unit input circuits are located at the input side of the switching fabric, it is especially advantageous to build in redundancy at the input circuits.

Although the embodiments described above are intended for use in ATM networks to switch ATM cells, it will be appreciated that the present invention can be applied in other embodiments to any communications network in which the data is in the form of packets.

Also, in another aspect of the invention it is possible to provide connection means that reduce the number of input ports of the switching means by employing other forms of multiplexing than time-division multiplexing, for example wavelength-division multiplexing and frequency-division multiplexing, to enable two or more data units to share the same input port.

What we claim is:

1. Switching apparatus including:
   a plurality of data units;
   cross-connect switching units having input ports and output ports providing plural data transfer paths at the same time, each said data transfer path serving to pass data received at one of said input ports to one of said output ports; and connection units connected to said input ports and to said data units delivering data packets from the data units to the input ports,
   wherein the data units operate in pairs to exchange data packets, one of the two data units of each such data-unit pair being a source data unit and the other of the two data-unit pair being a destination data unit receiving data packets from the source data unit of the pair, and each said data-unit pair is allocated a different one of said plural data transfer paths transferring the data packets from said source data unit to said destination unit so that a set of data-unit pairs, made up of as many data-unit pairs as there are output ports, can exchange data packets at a same time and said connection units deliver data packets at the same time from the source data units of all the data-unit pairs in the set to the input ports of the data transfer paths allocated to the data-unit pairs in the set, and being further operable, so that at least one of said input ports receives data packets from at least two different data units at different respective times, which data units together constitute a data delivery group associated with that input port.

2. Apparatus as claimed in claim 1, wherein said connection units are connected to all the data units and to all the input ports delivering data from each data unit to at least one input port of the cross-connect switching units.

3. Apparatus as claimed in claim 1, wherein the connection units are such that there is such a data delivery group, made up of at least two of said data units, associated with every input port of the cross-connect switching units.

4. Apparatus as claimed in claim 1, wherein said connection units provide each data unit of each data delivery group with its own controllable input connection from the data unit to its said associated input port, each said input connection being switchable from a data-passing state, in which it serves to pass data from its data unit to said associated input port, to a data-blocking state in which it is in a high-impedance condition;
   the switching of the input connections being controlled so that when the input connection of any one of the data units of the group is in the data-passing state the input connection of each other data unit of that group is in the data-blocking state.

5. Apparatus as claimed in claim 1, wherein:
   said cross-connect switching units include individual switching units, each switching unit providing the cross-connect switching units with fewer output ports than there are data units in the apparatus, and providing such data transfer paths only between the input ports of the unit and the output ports of the switching unit; and
   for each said data delivery group, said connection units operate at one time to deliver data from one data unit of the group to the input port associated with that group, which is an input port of one of the switching units, and operate at another time to deliver data from that data unit to a further one of said input ports which is an input port of another of the switching units.

6. Apparatus as claimed in claim 5, wherein, for each data unit, said connection units deliver data at different respective times from the data unit to an input port of each different switching unit of said plurality.

7. Apparatus as claimed in claim 6, wherein the connection units include, for each data unit, a corresponding connection unit including an input circuit having a data input connected to the data unit and receiving data therefrom, and also having as many data outputs as there are switching units in said plurality, each data output connected to an input port of a different one of said switching units, the input circuit being controllable to deliver at a selected one of those data outputs the data received at its said data input and to place each remaining data output in a high-impedance state.

8. Apparatus as claimed in claim 5, wherein each data delivery group has such an associated input port on each different one of the switching units.

9. Apparatus as claimed in claim 8, having M such switching units, where $M \geq 2$, each providing up to N input ports, wherein there are N data delivery groups, each having M data units.

10. Apparatus as claimed in claim 1, wherein said connection units comprise time-division multiplexing units for each data delivery group, operable repetitively to perform a preselected sequence of switching cycles that includes at least one first switching cycle, in which the time-division multiplexing units serve to deliver to the input port associated with the group data received from a first data unit of that group, and also includes at least one second switching cycle in which the time-division multiplexing units serve to deliver to that associated input port data received from a second data unit of that group different from said first data unit of the group.

11. Apparatus as claimed in claim 10, wherein the connection units further comprise scheduling units, connected with the time-division multiplexing units for each data delivery group, setting said sequence of switching cycles in dependence upon externally-applied control information.

12. Apparatus as claimed in claim 10, wherein the connection units include a connection unit corresponding to each data delivery group;

the connection unit comprising an input circuit having a plurality of data inputs connected respectively to the data units of the data delivery group, and also having a single data output connected to the input port associated with the group, and being operable, in each switching cycle of said preselected sequence that is allocated to each data unit of the group, to deliver, at its said data output, data received by the input circuit, via one of its said data inputs, from the data unit.

13. Apparatus as claimed in claim 12, wherein the connection unit corresponding to each data delivery group further comprises an output circuit having a single data input connected to one of said output ports, and also having a plurality of data outputs connected respectively to the data units of the data delivery group, and controllable to deliver the data received during each switching cycle to a selected one of its data outputs.

14. Apparatus as claimed in claim 1, wherein said connection units are also connected to said output ports of the cross-connect switching units delivering the data output by one data unit, after passage through the data transfer path, from the output port of that path to another of said data units.

15. Apparatus as claimed in claim 14, wherein:

said connection units are adapted to receive the data from the data units in n-bit parallel form and include a first data conversion unit converting the received data into bit-serial form or into m-bit parallel form, where men, for delivery to said input ports, and are also adapted to receive the data in said bit-serial form or in said m-bit parallel form, as the case may be, from said output ports and include a second data conversion unit converting the received bit-serial-form or m-bit-parallel-form data into said n-bit parallel form for delivery to the data units.

16. Apparatus as claimed in claim 1, further including a switching control unit connected to said data units for designating the data-unit pairs.

17. Apparatus as claimed in claim 16, wherein:

said cross-connect switching units and said connection units and said data units operate synchronously performing a series of switching cycles, the switching control unit determining the data-unit pair designations for each switching cycle, and in each switching cycle respective data packets belonging to the data-unit pairs are transferred in parallel through the respective allocated data transfer paths provided by the cross-connect switching units.

18. Apparatus as claimed in claim 16, wherein the switching control unit designates the data-unit pairs for each switching cycle in such a way as to avoid data packet contention in the apparatus.

19. Apparatus as claimed in claim 16, wherein the switching control unit determines the data-unit pair designations in dependence upon the volume and/or type of data received by the data units of said plurality.

20. Apparatus as claimed in claim 1, wherein the data units are also operable to exchange data in multicast groups, each group being made up of one such source data unit and more than one such destination data unit, and each multicast group being allocated as many such data transfer paths as there are destination data units in the group for use in transferring such a data packet output by said source data unit in parallel to all of said destination data units of the group.

21. Apparatus as claimed in claim 20, wherein:

said cross-connect switching units and said connection units and said data units operate synchronously performing a series of switching cycles, the switching control unit determining the data-unit pair designations for each switching cycle, and in each switching cycle respective data packets belonging to the data-unit pairs are transferred in parallel through the respective allocated data transfer paths provided by the cross-connect switching units; and one of said switching cycles is designated as a multicast switching cycle in which such a data packet output by the source data unit of such a multicast group is transferred in parallel to all of the destination data units of the group.

22. Apparatus as claimed in claim 20, wherein the data packet output by said source data unit of such a multicast group is delivered by the connection units to a single one of the ports of the cross-connect switching units, and the data transfer paths allocated to the group all have that port as their respective said input ports but have different respective said output ports.

23. Apparatus as claimed in claim 1, wherein said cross-connect switching units have a memory capacity of two data packets or less per data transfer path.

24. Apparatus as claimed in claim 20, wherein said source data unit of each designated data-unit pair, or each multicast group, as the case may be, is operable to include in each said data packet routing information indicating said destination data unit of the packet.

25. Apparatus as claimed in claim 24, wherein said cross-connect switching units include self-routing circuits operable, when such a data packet is received by the cross-connect switching units at one of its said ports, to allocate the packet such a data transfer path having that port as its said input port and having as its said output port a further one of the ports selected by the self-routing circuits in dependence upon said routing information included in the packet.

26. Apparatus as claimed in claim 24, wherein said connection units include self-routing circuits operable, when such a data packet is received by the connection units, to determine the port of the cross-connect switching units to which that packet is to be delivered in dependence upon said routing information included in the packet.

27. Apparatus as claimed in claim 1, wherein said cross-connect switching units have a plurality of dedicated input ports, each for receiving data only, and a plurality of dedicated output ports, each for outputting data only.

28. Apparatus as claimed in claim 1, wherein said ports of the cross-connect switching units are bidirectional ports which can be selected as said input port or as said output port of such a data transfer path.

29. Apparatus as claimed in claim 28, further including switching control unit connected to said data units for designating the data unit pairs;

said cross-connect switching units and said connection units and said data units operate synchronously performing a series of switching cycles, the switching control unit determining the data-unit pair designations for each switching cycle, and in each switching cycle respective data packets belonging to the data-unit pairs are transferred in parallel through the respective allocated data transfer paths provided by the cross-connect switching units; and one of said switching cycles has respective input and output phases and each of said bidirectional ports can be selected as said input port of one of said data transfer paths in said input phase of the cycle, and as said output port of another of said data transfer paths in said output phase of the cycle.

30. Apparatus as claimed in claim 1, wherein at least part of the circuitry of the connection units has redundancy circuitry.

31. Apparatus as claimed in claim 1, wherein each said data unit is connected operatively to one or more data ports of the apparatus and serves to pass data received at its data ports to the connection units and to pass to its data ports data that has been switched by the cross-connect switching units.

32. Apparatus as claimed in claim 1, wherein said data comprises ATM cells.

33. A connection device used in an ATM switching apparatus to deliver data from a data unit to a plurality of input ports of a Switch, including an input circuit having:
   a data input connected to said data unit to receive data therefrom;
   data outputs connected respectively to the said input ports, each data output being switchable from an active state, in which it serves to output data, to an inactive state in which it has a high impedance; and
   a data transfer units connected between said data input and said data outputs passing data received at said data input to a selected one of said data outputs, with the selected data output being switched to said active state, and switching remaining data output to the said inactive state;
   wherein said data input of the input circuit is adapted to receive data in n-bit parallel form from said data unit, and each data output is adapted to output data in bit-serial form or m-bit parallel form, where m<n, the data transfer units including a first data conversion unit converting the n-bit parallel-form data received at said data input into said bit-serial-form or said m-bit parallel form data for output at said selected one of the data outputs.

34. A connection device as claimed in claim 33, wherein the connection device further includes an output circuit having a data input connected to an output port of the switch and adapted to receive data therefrom in said bit-serial form or said m-bit parallel form as the case may be, and also having a data output connected to said data unit and adapted to output data thereto in said n-bit parallel form, the output circuit including a second data conversion unit connected between said data input and said data output of the output circuit converting said bit-serial-form or said m-bit-parallel-form data received at the data input of the output circuit into said n-bit parallel-form data for output at said data output of the output circuit.

35. A connection device used in an ATM switching apparatus to deliver data from a data unit to a plurality of input ports of a switch, including an input circuit having:
   a data input connected to said data unit to receive data therefrom;
   data outputs connected respectively to said input ports, each data output being switchable from an active state, in which it serves to output data, to an inactive state in which it has a high impedance; and
   a data transfer units connected between said data input and said data outputs passing data received at said data input to a selected one of said data outputs, with selected data output being switched to said active state, and switching each remaining data output to said inactive state;
   wherein said data unit delivers its said data to the data input of the input circuit in the form of data packets, each packet including routing information indicating an intended destination of the packet, the device further comprising a self-routing circuit operable, when such a packet is received at said data input of the input circuit, to select the data output of the input circuit from which the packet is to be output in dependence upon said routing information.

36. A connection device used in an ATM switching apparatus to deliver data from a plurality of different data units to an input port of a switch, including an input circuit having:
   data inputs connected respectively to said data units to receive data therefrom;
   a data output connected to said input port; and
   a data transfer units connected between said data inputs and said data output selecting the data inputs individually in a predetermined sequence and passing data received at the selected data input to said data output; and
   the device further including an output circuit having a single data input connected to an output port of the switch to receive data therefrom, and also having a plurality of data outputs connected respectively to said data units, and a data transfer unit connected between said data input and said data outputs of the output circuit operating to pass data received at that data input to a selected one of those data outputs.

37. A connection device as claimed in claim 36, wherein:
   each said data input of the input circuit is adapted to receive data in n-bit parallel form from one of the data units, and the data output of the input circuit is adapted to output data in bit-serial form or m-bit-parallel-form, where m<n, the data transfer units of the input circuit including a first data conversion unit converting the n-bit parallel-form data received at each said data input into said bit-serial-form or m-bit-parallel-form data for output at the selected data output of the input circuit; and
   said data input of the output circuit is adapted to receive data from the said output port in said bit-serial form or said m-bit-parallel-form as the case may be, and each said data output of the output circuit is adapted to output data to one of the data units in said n-bit parallel form, the data transfer unit of the output circuit including a second data conversion unit converting the bit-serial-form or m-bit-parallel-form data received at the data input of the output circuit into parallel-form data for output at said selected data output of the output circuit.

38. A connection device used in an ATM switching apparatus to deliver data from a plurality of different data units to an input port of a switch, including an input circuit having:
   data inputs connected respectively to said data units to receive data therefrom;
   a data output connected to said input port; and
   a data transfer unit connected between said data inputs and said data output selecting the data inputs individually in a predetermined sequence and passing data received at the selected data input to said data output; and
   wherein said data units deliver their said data to the respective data inputs of the input circuit in the form of data packets, each packet including routing information including an intended destination of the packet, the device further comprising self-routing circuits operable, when such packet is received at said data inputs of said input circuit, to select the data output of the input circuit from which that packet is to be output in dependence upon said routing information.

39. A cross-connect switching device including:

a plurality of ports, at least one of which is a bidirectional port;

data transfer unit in communication with the ports and selectively controllable to provide a plurality of data transfer paths, each transferring data from one of the ports to another of the ports; and port control units connected between the data transfer units and said bidirectional port and switchable from an input configuration, in which that port is employed as an input port receiving data to be transferred to another port by the data transfer units, to an output configuration in which the same port is employed as an output port outputting data received at another port and transferred to said output port by the data transfer units.

40. A device as claimed in claim 39, wherein:

each of said ports is a bidirectional port; and said port control units are connected with each of the ports of said plurality and are operable, when in said input configuration, to employ each of the ports as an input port receiving data to be transferred to another port by the data transfer units, and, when in said output configuration, to employ each of said ports as an output port outputting data received at another port and transferred to the output port by the data transfer units.

41. A device as claimed in claim 39, operative alternately in input and output phases, said port control units having said input configuration in each said input phase and having said output configuration in each said output phase.

42. A device as claimed in claim 39, adapted to receive data at its said ports in the form of data packets, each packet including routing information, the device further comprising:

self-routing circuits operable, when such a data packet is received at one of said ports, to employ such routing information to determine the port to which that packet is to be transferred by the data transfer units.

43. A device as claimed in claim 42, wherein the routing information carried by each data packet indicates the intended destination of the packet.

44. A device as claimed in claim 42, wherein each data packet received by the device at one of its said ports carries routing information indicating the intended destination of the next data packet that is to be received by the device at the port, and said self-routing circuits employ the routing information received with each packet to determine the port to which the next packet is to be transferred by the data transfer units.

45. A device as claimed in claim 39, further including:

a multicast unit connected with said data transfer units causing the data transfer units to provide two or more such data transfer paths transferring data received at one of said ports in parallel to respective other ports of the device.

46. Switching apparatus including:

a plurality of data units;

cross-connect switching means, having input ports and output ports, for providing plural data transfer paths at the same time, each said data transfer path serving to pass data received at one of said input ports to one of said output ports; and connection means connected to said input ports and to said data units, for delivering data packets from the data units to the input ports, wherein the data units operate in pairs to exchange data packets, one of the two data units of each such data-unit pair being a source data unit and the other of the two data-unit pair being a destination data unit for receiving data packets from the source data unit of the pair, and each said data-unit pair is allocated a different one of said plural data transfer paths for transferring the data packets from said source data unit to said destination unit so that a set of data-unit pairs, made up of as many data-unit pairs as there are output ports, can exchange data packets at a same time and said connection means delivers data packets at the same time from the source data units of all the data-unit pairs in the set to the input ports of the data transfer paths allocated to the data-unit pairs in the set, and being further operable, so that at least one of said input ports receives data packets from at least two different data units at different respective times, which data units together constitute a data delivery group associated with that input port.

47. A connection device for use in ATM switching apparatus to deliver data from a data unit to a plurality of input ports of a switch, including an input circuit having:

a data input for connection to said data unit to receive data therefrom;

data outputs for connection respectively to said input ports, each data output being switchable from an active state, in which it serves to output data, to an inactive state in which it has a high impedance; and data transfer means connected between said data input and said data outputs for passing data received at said data input to a selected one of said data outputs, with selected data output being switched to said active state, and switching remaining data output to said inactive state;

wherein said data input of the input circuit is adapted to receive data in n-bit parallel form from said data unit, and each data output is adapted to output data in bit-serial form or m-bit parallel form, where m<n, the data transfer means including first data conversion means for converting the n-bit parallel-form data received at said data input into said bit-serial-form or said m-bit parallel form data for output at said selected one of the data outputs.

48. A connection device for use in ATM switching apparatus to deliver data from a plurality of different data units to an input port of a switch, including an input circuit having:

data inputs for connecting respectively to said data units to receive data therefrom;

a data output for connection to said input port; and data transfer meanss connected between said data inputs and said data output for selecting the data inputs individually in a predetermined sequence and passing data received at the selected data input to said data output; and the device further including an output circuit having a single data input for connection to an output port of the switch to receive data therefrom, and also having a plurality of data outputs for connection respectively to said data units, and data transfer means connected between said data input and said data outputs of the output circuit and operable to pass data received at that data input to a selected one of those data outputs.

49. A cross-connect switching device including:

a plurality of ports, at least one of which is a bidirectional port;

data transfer means selectively controllable to provide a plurality of data transfer paths, each for transferring data from one of the ports to another of the ports; and port control means connected between the data transfer units and said bidirectional port and switchable from an input configuration, in which that port is employed as an input port for receiving data to be transferred to another port by the data transfer means, to an output configuration in which the same port is employed as an output port outputting data received at another port and transferred to said output port by the data transfer means.

* * * * *

UNITED STATES PATENT AND TRADEMARK OFFICE
CERTIFICATE OF CORRECTION

PATENT NO. : 6,188,686 B1
DATED : February 13, 2001
INVENTOR(S) : Graeme Roy Smith It is certified that error appears in the above-identified patent and that said Letters Patent is hereby corrected as shown below:

Column 31,
Line 30, change "men" to --m<n--.

Column 32,
Line 55, after "including" insert --a--.

Signed and Sealed this

Seventh Day of August, 2001

Attest:

NICHOLAS P. GODICI
Attesting Officer   Acting Director of the United States Patent and Trademark Office